Figure 1A:
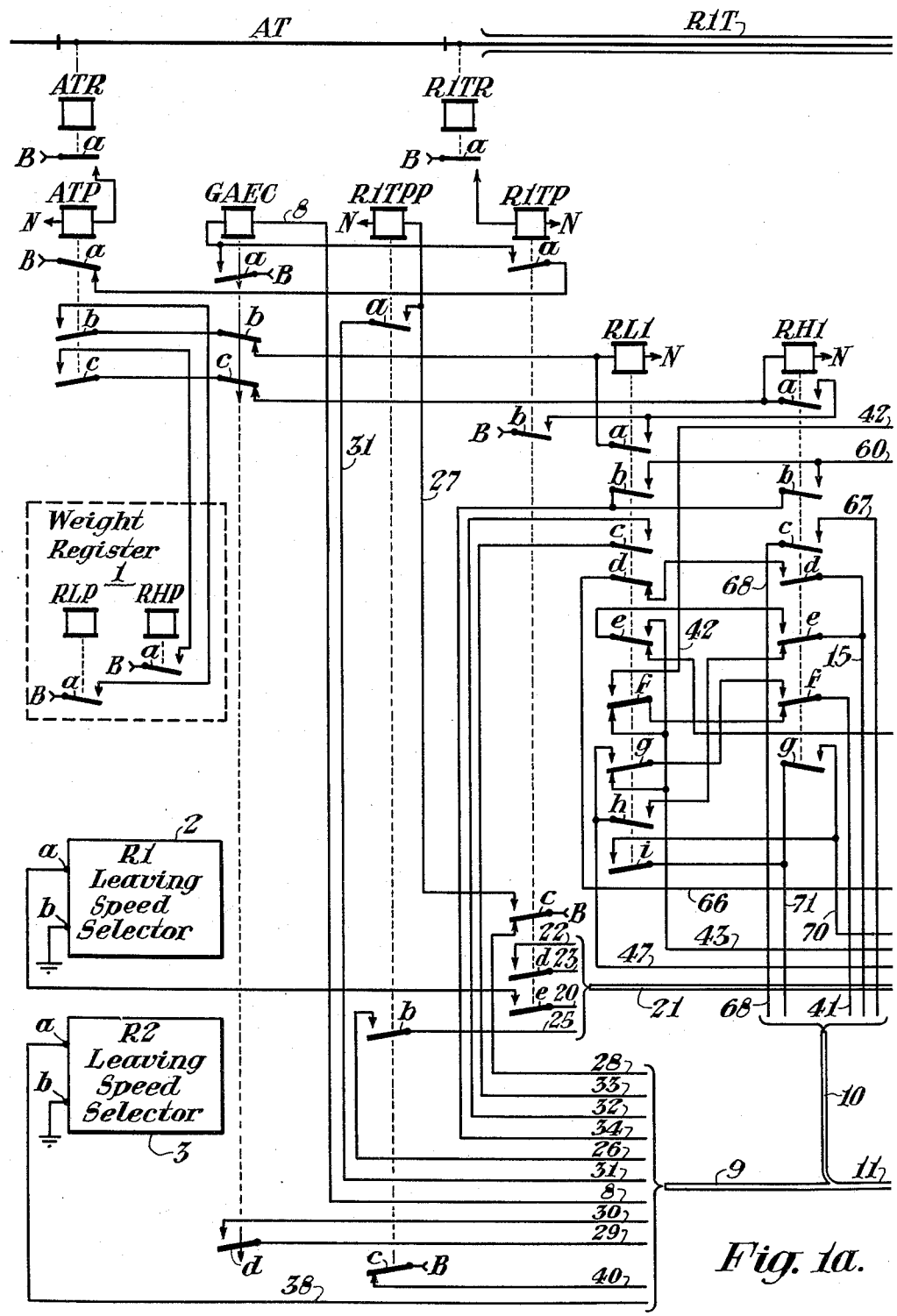

2,998,515
SPEED CONTROL SYSTEM
Richard D. Campbell, Harmarville, and Joseph M. Berill, Edgewood, Pa., assignors to Westinghouse Air Brake Company, Wilmerding, Pa., a corporation of Pennsylvania
Filed Feb. 28, 1958, Ser. No. 718,312
19 Claims. (Cl. 246—182)

This invention relates to control apparatus, and in particular to an improved control system for railway classification yards.

It has long been desired to control automatically the speed and route of cuts of one or more cars entering a classification yard to direct each cut to its desired destination on a preselected storage track, and to cause the cut to arrive at its destination and couple with the preceding cars on the storage track at a sufficiently low speed to prevent damage to lading. Systems for this purpose have now been devised, one such system being disclosed and claimed in copending application Serial No. 676,730, filed August 7, 1957, by D. P. Fitzsimmons and W. A. Robison, Jr. for Automatic Control System for Railway Classification Yards, and assigned to the assignee of our present application.

To successfully operate such a system, it is necessary to control the speed of cars leaving the retarders located along their routes very precisely, since it has been found that very small errors in retarder leaving speeds may lead either to unacceptably high leaving velocities, or to cuts which stall before they reach their destinations, the latter requiring the interruption of automatic operation while a switch engine is brought up to trim the yard. It is an object of our invention to provide a control system for such retarders which will control the speed of cars very accurately to values which have been selected in accordance with the weight and rolling characteristics of the cut.

We have found that a control system which might be perfectly satisfactory for a cut of cars of average weight would be inadequate to handle either light or heavy cars, since the force exerted by the retarders in response to a given speed error would be excessive for the former and insufficient for the latter. In addition, the time constant of a retarder speed control system, as determined by the rate of response of the retarder brake shoes to a speed error detected by the sensing elements of the system, must be relatively short with respect to the length of time the car is in the retarder. Accordingly, since the rate of response is determined by the increment of force supplied per unit time to correct a given speed error, and since a given force increment will affect a light car more than a heavy car, it is a further object of our invention to provide a control system which has a rate of response dependent on the weight of cars in the retarder.

Other objects and further advantages of our invention will be apparent to those skilled in the art as the description proceeds.

In practicing our invention, we prefer to employ electro-pneumatic retarders having separate pressure control means for a plurality of sections, although one section retarders, or multiple section retarders controlled jointly by a single control means, may be employed within the scope of our invention if so desired. In order to measure the speed of cuts of one or more cars in the retarders, we preferably provide a separate speed measuring means for each independently controlled retarder unit of one or more sections, which, for example, might be a radar velocity meter of the type disclosed in the above-mentioned copending application of Fitzsimmons and Robison. The average axle loading of each cut entering the retarder is measured by any suitable conventional means, and means are provided for storing this weight information for each cut during the time it occupies the retarder. In order to adjust the rate of response of the brake shoes of the retarder, we provide a plurality of intake and exhaust valves for admitting or releasing fluid under pressure from the actuating cylinders of the retarders, and means for selecting one or more of these valves in combination for use in controlling a particular cut in accordance with the registered weight of the cut. Means are provided for producing a signal in accordance with the selected leaving speed of each cut from the retarder, and we further provide speed comparing means for comparing the selected speed with the measured speed of each cut. The speed comparing means produce signals which operate the valves selected by the weight registration means to control the braking force exerted by the retarder, thereby reducing the leaving speed of the cut to its selected value.

We shall first describe one embodiment of our invention in detail, and shall then point the novel features thereof in claims.

As previously stated, the apparatus of this disclosed embodiment of our invention is intended to be employed as one component of a system of the class described and claimed in the above-mentioned copending application of Fitzsimmons and Robison. We have indicated this correspondence with the system by showing in block form those components of the system with which our invention cooperates, but have made no attempt to show such components in detail, since they are fully described in the copending application.

In the drawings, corresponding parts are designated by corresponding reference characters. In order to simplify the drawings, we have represented a conventional D.C. power supply by the symbols B and N associated with arrow symbols to indicate connections to the positive and negative terminals of the power supply, respectively. Other power sources which supply only local portions of the system are shown by conventional battery symbols adjacent the apparatus which they supply. The conventional ground symbol shown in the drawings may be assumed to refer to the same reference potential whereever it occurs. In the drawings:

FIGS. 1a through 1e, when arranged side by side in alphabetical order, comprise a schematic wiring diagram, with mechanical elements shown diagrammatically and partly in section.

Referring now to the drawings, we have shown a segment of a route in a classification yard passing through a retarder having two operating sections, although only one, or more than two, such sections could be employed if so desired. This route could correspond, for example, to the route segment shown in FIGS. 27 through 32 of the above-mentioned copending application, beginning with track section CL4T in FIG. 27. As here shown, the route includes a stretch of track divided into an approach section AT, a first retarder track section R1T, a second retarder track section R2T, and a switch detector track section WT. Each of these track sections is provided with a track relay which is released when the associated track section is occupied and energized when the associated track section is unoccupied, in a conventional manner which need not be further described. In particular, track section AT is provided with a track relay ATR, track section R1T with a track relay R1TR, track section R2T with a track relay R2TR, and track section WT with a track relay WTR.

Referring now to FIG. 1a of the drawings, a weight register 1 is shown which may correspond to the weight measuring and registration equipment shown in the above-mentioned copending application of Fitzsimmons and Robison, and in which relays RLP and RHP may be assumed to correspond to relays ALP and AHP in FIG. 43 of the copending application, the illustrated retarder location thus corresponding to one of the group retarder locations in a yard constructed as described in the copending application. However, our invention is also applicable to the control of master or intermediate retarders, in which case these relays might be replaced by the direct repeater relays H, L and LS of FIG. 34 of the copending application.

An R1 speed selector 2 for the first section of the retarder and an R2 speed selector 3 for the second section of the retarder are shown in FIG. 1a in block form. Since the details of these speed selectors do not form a part of our present invention, they are not shown. However, they might correspond to electronic storage unit 1–2GR1–ESU and 1–2GR2–ESU, respectively, in FIG. 45 of the copending application. On the other hand, if the retarder to be controlled is a master or intermediate retarder, these speed selectors might be of the type shown in FIG. 34 of the copending application. It is sufficient for the purposes of illustrating our invention to note that these speed selectors provide voltages at their output terminals $a$ with respect to their ground terminals $b$ which have values proportional to the selected leaving speed of a particular cut from the retarder. Since the manner of controlling speed selectors of this kind to produce a selected speed voltage for each cut is fully described in the above-mentioned copending application, it will not be described in detail.

In order to establish the proper sequence of operations and to register the weight for each cut as it approaches the retarder, as shown in FIG. 1a, we provide a first plurality of relays ATP, GAEC, R1TPP, R1TP, and weight registration relays RL1 and RH1.

Relay ATP is a direct back contact repeater of track relay ATR, and has an obvious energizing circuit extending from terminal B of the battery over back contact $a$ of relay ATR, and through its own winding to terminal N of the battery. This relay is accordingly picked up or released according as its associated track circuit is occupied or unoccupied, respectively.

Relay R1TPP has a pickup circuit which extends from terminal B of the battery over the front point of contact $c$ of relay R1TP, lead 27, and through the winding of relay R1TPP to terminal N of the battery. This relay is accordingly picked up when relay R1TP is picked up upon the occupancy of track section R1T. Relay R1TPP has a stick circuit which extends from terminal B of the battery over the back point of contact $e$ of relay R1EC (FIG. 1d), to be described, lead 31, cable 18, cable 16, cable 14, cable 13, cable 11, cable 9 (FIG. 1a), lead 31, and over its own front contact $a$ and through its winding to terminal N of the battery. As will appear, once picked up, relay R1TPP will remain up until track section R1T has been cleared as indicated by the energized condition of relay R1EC.

Relay GAEC (FIG. 1a) has a pickup circuit which extends from terminal B of the battery over back contact $a$ of relay ATP, front contact $a$ of relay R1TP, through the winding of relay GAEC, lead 8, cable 9, cable 11, cable 13 (FIG. 1d), cable 14, cable 16, cable 18, lead 8, and over back contact $d$ of relay R1EC to terminal N of the battery. As will appear, relay GAEC is picked up by this circuit when a cut occupies section R1T after section AT has been vacated. Relay GAEC has a stick circuit which extends from terminal B of the battery over its own front contact $a$ through its winding, and thence over lead 8 and the path just traced to back contact $d$ of relay R1EC and thence to terminal N of the battery. Once picked up, relay GAEC is accordingly held up until the cut clears section R1T as indicated by the energized condition of relay R1EC. As shown, relay GAEC is made slightly slow to release, for a purpose which will appear.

As fully described in the above-mentioned copending application, relays RLP and RHP in weight register 1, which may, as previously stated, correspond to relays ALP and AHP in FIG. 43 of the above-mentioned copending application, are picked up or released in a combination determined by the axle loading of the cut. In particular, if both relays are energized, a cut having an average weight per car of between 32 and 50 tons, classified as of medium weight, is indicated. If only relay RLP is picked up, a light weight cut comprising cars of between 16 and 32 tons is indicated. If only relay RHP is picked up, a heavy cut comprising cars weighing over 50 tons is indicated. Obviously, for American cars having 8 wheels per car, and for English wagons having 4 wheels per car, the axle loadings corresponding to the above car weights would be ⅛ and ¼, respectively, of the car weights. Accordingly, it is immaterial whether the weighing device is considered to be responsive to the car weight or to the axle loading.

Relays RL1 and RH1 repeat the information stored in relays RLP and RHP when the cut enters approach track section AT. For this purpose, relay RL1 is provided with an energizing circuit which extends from terminal B of the battery over front contact $a$ of relay RLP, front contact $b$ of relay ATP, back contact $b$ of relay GAEC, and through the winding of relay RL1 to terminal N of the battery. Relay RH1 has a pickup circuit which extends from terminal B of the battery over front contact $a$ of relay RHP, front contact $c$ of relay ATP, back contact $c$ of relay GAEC, and through the winding of relay RH1 to terminal N of the battery. Relays RL1 and RH1, or the combination thereof which is energized for a particular cut, once picked up are held up over a stick circuit which extends from terminal B of the battery over front contact $b$ of relay R1TP, and thence over parallel paths including the front contact $a$ of energized ones of relays RL1 and RH1, and through the winding of the respective relays to terminal N of the battery.

Figure 1B:
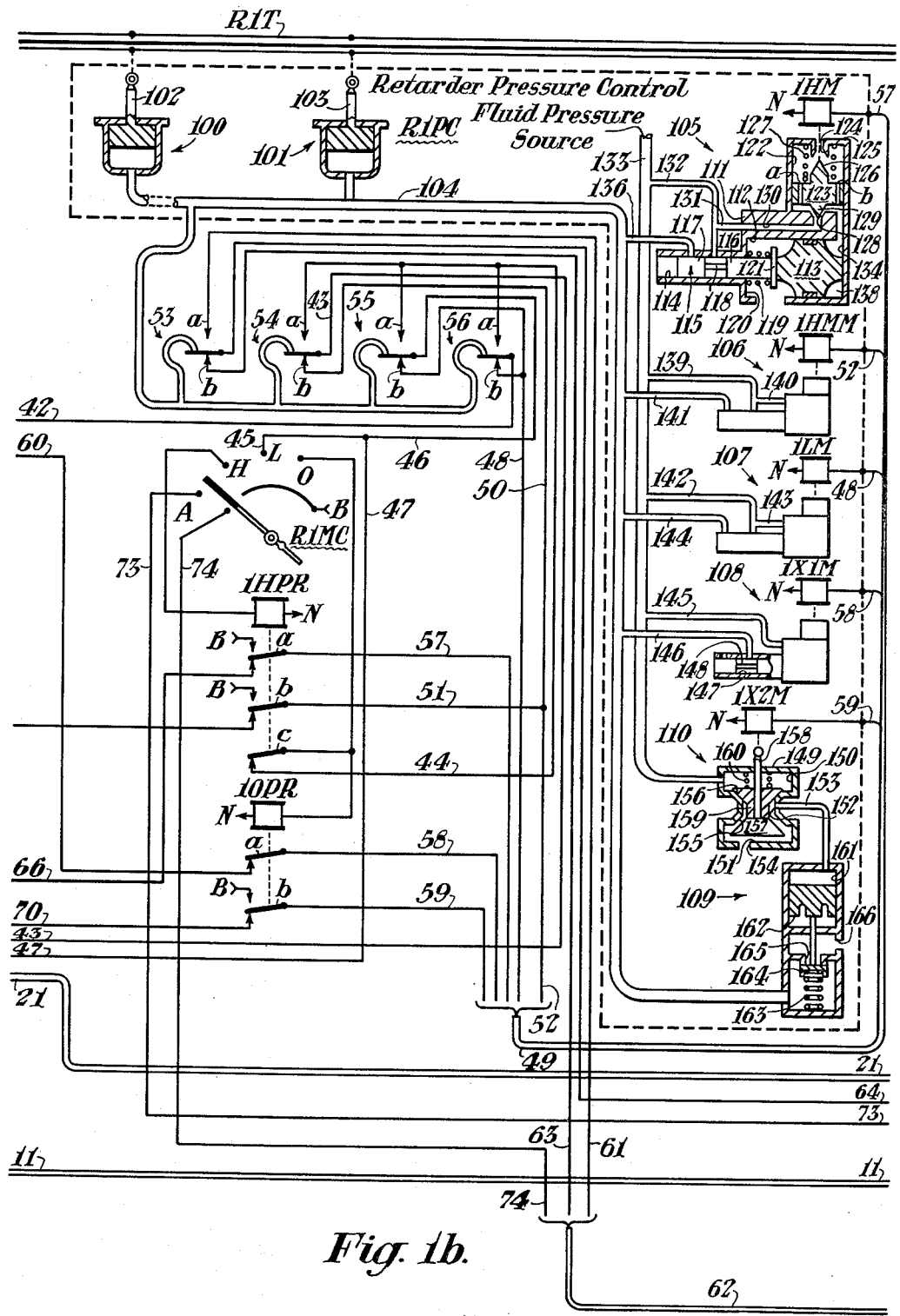
Figure 1C:
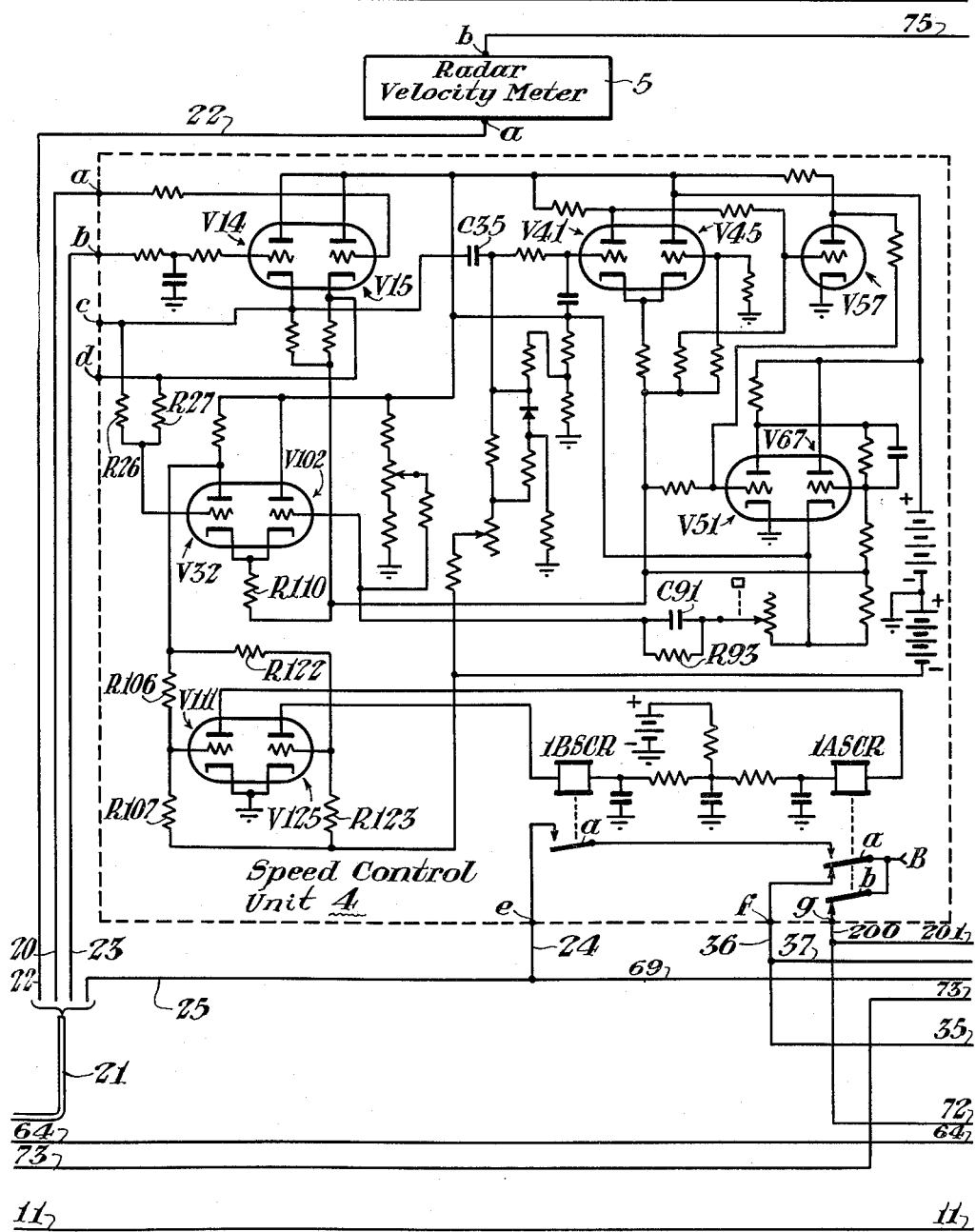
Figure 1D:
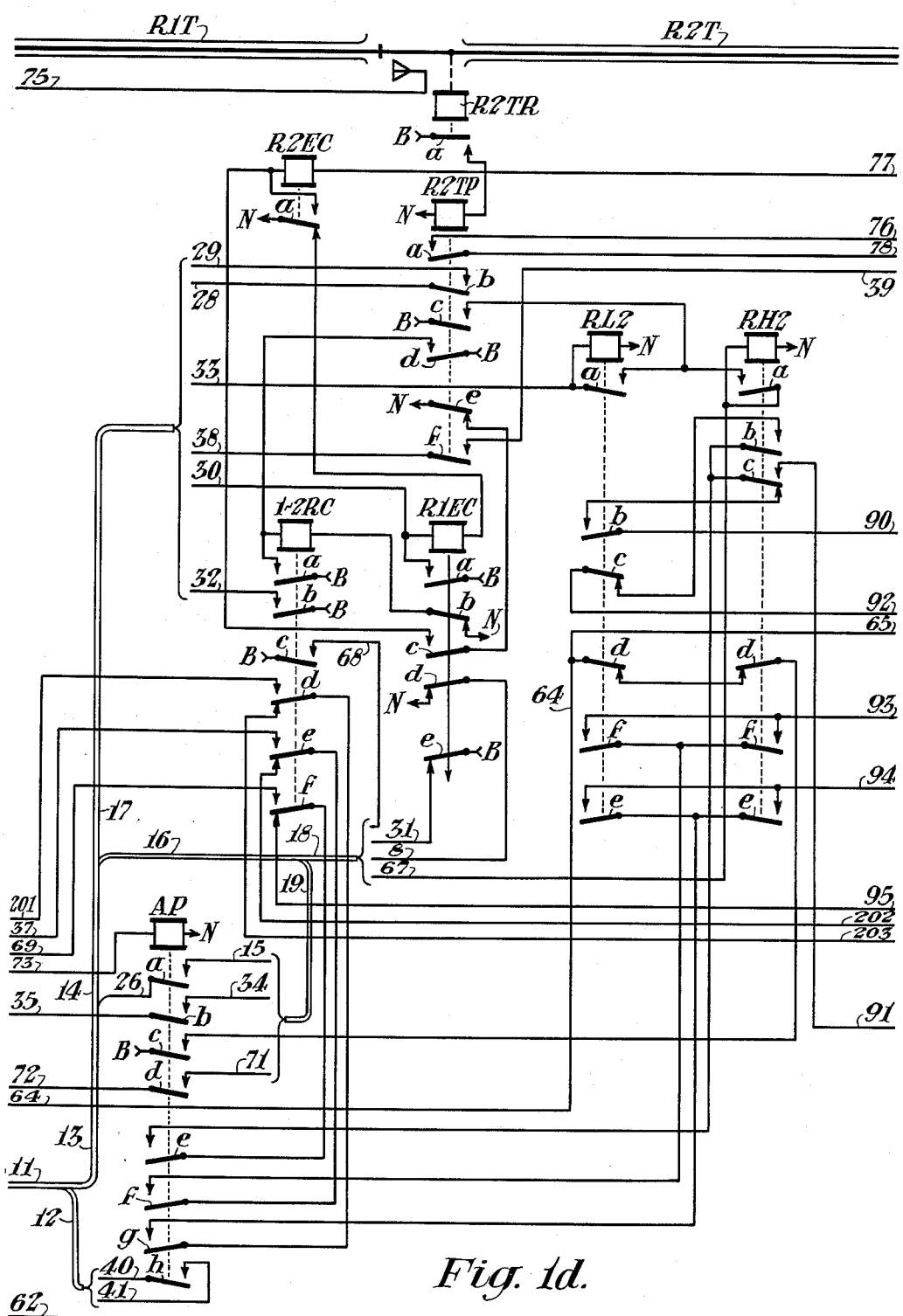

Referring now to FIG. 1d, in accordance with the illustrated embodiment of our invention, we provide control relays R2TP, R1EC, 1–2RC and R2EC, to mark the progress of each cut through the retarder, and weight registration relays RL2 and RH2 for storing the weight of each cut during the time it occupies the second section of the retarder.

Relay R2TP has an obvious energizing circuit which extends from terminal B of the battery over back contact $a$ of track relay R2TR, and through the winding of relay R2TP to terminal N of the battery. This relay is accordingly picked up or released according as track R2T is occupied or unoccupied, respectively.

Relay R1EC has a pickup circuit extending from terminal B of the battery over the back point of contact $c$ of relay R1TP (FIG. 1a), lead 28, cable 9, cable 11, cable 13 (FIG. 1d), cable 14, cable 17, lead 28, front contact $b$ of relay R2TP, lead 29, cable 17, cable 14, cable 13, cable 11, cable 9 (FIG. 1a), lead 29, front contact $d$ of relay GAEC, lead 30, cable 9, cable 11, cable 13 (FIG. 1d), cable 14, cable 17, lead 30, through the winding of relay R1EC, and over the back point of contact *a* of relay R2EC to terminal N of the battery. Relay R1EC has a stick circuit extending from terminal B of the battery over its own front contact *a* and through its winding, and thence over the back point of contact *a* of relay R2EC to terminal N of the battery. Relay R1EC is accordingly picked up after track section R1T has been vacated, as indicated by the released condition of relay R1TP, while track section R2T is occupied, as indicated by the energized condition of relay R2TP, and is held up until the cut has cleared section R2T, as indicated by the energization of relay R2EC, to be described. The contact of relay GAEC is included in the pickup circuit for relay R1EC to check that the system is operating normally and that the cut has cleared section AT. Relay R1EC is made somewhat slow to release, as shown, to permit a circuit for relay R2EC, to be described, to be completed.

Relay 1–2RC (FIG. 1d) has a pickup circuit extending from terminal B of the battery over front contact *d* of relay R2TP, through the winding of relay 1–2RC, and over back contact *b* of relay R1EC to terminal N of the battery. Relay 1–2RC has a stick circuit extending from terminal B of the battery over its own front contact *a*, through the winding of the relay, and over back contact *b* of relay R1EC to terminal N of the battery. Relay 1–2RC is accordingly picked up when the cut is occupying both track section R1T and R2T, as indicated by the fact that relay R2TP is energized and that relay R1EC has not yet been energized. Once picked up, relay 1–2RC is held up until section R1T is cleared, as indicated by the energized condition of relay R1EC.

Relay R2EC has a pickup circuit extending from terminal B of the battery over back contact *a* of track relay WTR (FIG. 1e), lead 77, through the winding of relay R2EC, over front contact *c* of relay R1EC, and over back contact *e* of relay R2TP to terminal N of the battery. Relay R2EC has a stick circuit extending from terminal B of the battery over back contact *a* of relay WTR, lead 77, through its own winding, and over the front point of its own contact *a* to terminal N of the battery. Relay R2EC is accordingly picked up when track section R2T is vacated while switch detector track section WT is occupied, and is held up until track section WT is vacated.

Weight registration relay RL2 has a pickup circuit which extends from terminal B of the battery over front contact *b* of relay 1-2RC (FIG. 1d), lead 32, cable 17, cable 14, cable 13, cable 11, cable 9 (FIG. 1a), lead 32, front contact *c* of relay RL1, lead 33, cable 9, cable 11, cable 13 (FIG. 1d), cable 14, cable 17, lead 33, and through the winding of relay RL2 to terminal N of the battery. Relay RL2 accordingly repeats the indication of relay RL1 when the cut is occupying both sections R1T and R2T. Relay RL2 has a stick circuit which extends from terminal B of the battery over front contact *c* of relay R2TP, its own front contact *a*, and through the winding of the relay to terminal N of the battery. Once picked up, relay RL2 is accordingly held up until track section R2T is vacated.

Weight registration relay RH2 has a pickup circuit which extends from terminal B of the battery over front contact *c* of relay 1–2RC (FIG. 1d), lead 68, cable 18, cable 16, cable 14, cable 13, cable 11, cable 10 (FIG. 1a), lead 68, front contact *c* of relay RH1, lead 67, cable 10, cable 11, cable 13 (FIG. 1d), cable 14, cable 16, cable 18, lead 67, and through the winding of relay RH2 to terminal N of the battery. Relay RH2 accordingly repeats the condition of relay RH1 when relay 1–2RC is energized to indicate that a cut is occupying both sections R1T and R2T. Relay RH2 has a stick circuit which extends from terminal B of the battery over front contact *c* of relay R2TP, its own front contact *a*, and through the winding of the relay to terminal N of the battery. Once picked up, relay RH2 is accordingly held up as long as track section RT2 is occupied.

Referring now to FIG. 1b, the first section of the retarder is provided with a pressure control unit R1PC. Pressure control unit R1PC is provided with one or more actuating cylinders, such as 100 and 101, having pistons such as 102 and 103 connected to the braking bars of the retarder. These cylinders are connected either to atmosphere, or to a suitable source of pressure, not shown, by means of a manifold 104. The supply of fluid from the source to the manifold is controlled by three fast acting intake valves 105, 106 and 107. These intake valves are controlled, in a manner to be described, by control magnets 1HM, 1HMM and 1LM, respectively. Manifold 104 is connectable to the atmosphere, or any suitable fluid return, by means of a plurality of exhaust valves having different characteristics. While any number of such valves may be employed within the scope of our invention, at least one fast-acting valve such as 108, which may be of the same construction as intake valves 105 and 106, is employed, and at least one larger capacity and relatively more slowly acting valve 109 is employed. Valve 108 is controlled by a magnet 1X1M, and valve 109 is controlled by a pilot valve 110, which is in turn controlled by a magnet 1X2M. The pressure in manifold 104 is registered by four Bourdon tubes 53, 54, 55 and 56. These Bourdon tubes operate contacts in a manner to be described.

Valve 105 which is also typical of valves 106 and 107, may be of any conventional design, but is preferably of the type sold by Westinghouse Air Brake Company under the same "Pilotaire." As schematically shown, such a valve may comprise a casing 111 including a first cylindrical passage 112 in which a piston 113 is slidably mounted. A second cylindrical passage 114 is formed in casing 111, in which a valve stem 115 formed integrally with piston 113 is slidably received. Stem 115 comprises a first portion 116 and a second portion 117 which are substantially the same diameter as passage 114, and a reduced portion 118 which is of smaller diameter than the passage. A spring 119 is mounted between end wall 120 of passage 112 and a retaining flange 121 formed on piston 113.

A third cylindrical chamber 122 is formed in casing 111, and slidably received in this chamber is a valve element 123. Valve element 123 is provided with vent passages, such as *a* and *b*.

A valve seat 124 is formed about a port in end wall 125 of chamber 122. A valve portion 126, formed on valve element 123, is adapted to engage seat 124 in sealing relationship. A spring 127 is disposed between valve seat 124 and portion 126 of valve element 123 to urge the valve element out of engagement with the valve seat.

A second valve seat 128 is formed about a port in chamber 122 at the opposite side of valve element 123, and is adapted to engage a mating portion 129 formed on valve element 123 in sealing relationship.

A port 130 in casing 111 communicates with chamber 122, and is connected at the other end through conduits 131 and 132 to manifold 133, which is connected to the fluid pressure source, not shown.

Conduit 132 connects chamber 114 to supply manifold 133, and a second conduit 136 connects chamber 114 to manifold 104, as shown.

Intake magnet 1HM has an armature connected to move portion 126 of valve element 123 into engagement with valve seat 124 against the resistance of spring 127 when the magnet is energized.

In operation, when magnet 1HM is deenergized, fluid pressure from supply manifold 133 appearing in conduits 132, 131 and 130 is prevented from entering chamber 122 by engagement of valve portion 129 with seat 128. Any fluid which might leak around member 129 would be released to the atmosphere through passages such as *a* and *b* in valve 123 and the open port in chamber 122.

Conduit 132 is cut off from conduit 136 in this condition of the apparatus by portion 117 of valve stem 115.

Piston 113 is maintained in the position shown in the drawing by the action of spring 119. When magnet 1HM is energized, valve element 123 is drawn up against the force of spring 127, causing portion 126 to engage seat 124 and close the port in wall 125. Fluid pressure from manifold 133 is then conducted to compartment 138 in chamber 112 through conduits 132, 131 and 130, chamber 122, and passage 134. Piston 113 is then moved against the force of spring 119 and reduced portion 118 will permit fluid pressure from supply manifold 133 to be conducted through conduits 132 and 136 to manifold 104 and thence to cylinders 100 and 101 and such other cylinders as may be provided in any particular case. It is found that this construction results in rapid response of the actuating cylinders to the energization of magnet 1HM.

Valves 106 and 107 are constructed identically with valve 105 and hence will not be described in detail. However, in accordance with a preferred embodiment of our invention, valve 107 is made approximately half the size and capacity of valves 105 and 106, and is correspondingly more rapid in its response. Conduits 139, 140 and 141 of valve 106 correspond to conduits 132, 131 and 136, respectively, of valve 105. Similarly, conduits 142, 143 and 144 of valve 107 correspond to conduits 139, 140 and 141 of valve 106.

It will be apparent that varying rates of response may be secured by energizing one or more of magnets 1LM, 1HMM and 1HM in combination, and circuits for carrying out this function will be described below.

Exhaust valve 108 is identical in structure with valve 105, except that it has only a single supply conduit 145 corresponding to conduits 132 and 131 of valve 105, and that its manifold connection is to the rear port of its valve chamber 147, while the forward port is connected to atmosphere. When energized, the reduced portion 148 of the valve stem moves to the left in FIG. 1b, connecting manifold 104 to atmosphere through conduit 146, and thus initiating, almost immediately, a relatively slow decrease of pressure in the operating cylinders.

Exhaust valve 109 may be of a type well known in the art, and formerly used as a sole means of control for conventional retarders. It is characterized by opening more slowly than valve 105, but once opened it has a capacity substantially greater than the smaller valves. As shown, valve 109 may comprise a piston 162 in a chamber 161, the piston controlling a valve 164 urged into engagement with a seat 165 by a spring 163. The opening of valve 164 connects manifold 104 to atmosphere through port 166.

Valve 109 is controlled by a pilot valve 110 of conventional solenoid-operated construction. As schematically shown, pilot valve 110 comprises a casing 149 having a first chamber 150 and a second chamber 151 joined by a passage 152. The source of fluid pressure is connected to chamber 150 by manifold 133. Connecting passage 152 is provided with an output conduit 153. Chamber 151 is vented to the atmosphere, or other suitable fluid return, by a port 154.

The ends of passage 152 are formed into valve seats 155 and 156. A first valve element 157 is adapted to cooperate with valve seat 155 and has a stem 158 connected to the armature of a magnet or solenoid 1X2M. A second valve element 159 has a central opening in which stem 158 is slidably received. Valve element 159 is normally urged into engagement with valve seat 156 by a spring 160 disposed around stem 158 and confined by the valve member 159 and the end wall of casing 149.

In operation, when magnet 1X2M is energized, stem 158 is raised, urging valve member 157 into engagement with valve seat 155. Fluid pressure from manifold 133 is then supplied from conduit 153 to upper chamber 161 in valve 109, driving piston 162 downwardly against the force of spring 163 and disengaging valve 164 from its seat 165 to vent manifold 104 through port 166.

The pressure control unit just described has varying response characteristics depending on the desired rate and extent of response. Energizing one or more of intake magnets 1LM, 1HMM and 1HM causes air to be supplied to the operating cylinders at different rates, varying from a slow rate quickly established with valve 107 alone, to a rapid rate obtained by the use of valves 105 and 106 in parallel. A medium response is obtained by the use of valve 106 alone. The exhaust magnets are normally energized in parallel in the automatic operation of the system, and one or a plurality of valves may be supplied in parallel with each of the illustrative valves 108 and 109. If both magnets 1X1M and 1X2M are simultaneously energized, valve 108 responds very rapidly to produce a relatively slow pressure decrease in the operating cylinders, which is quickly reflected by the action of the Bourdon tubes. The control system thus rapidly responds to the fact that operation has been commenced, thereby materially improving the system damping. The larger valve 109, opening after valve 108 provides the bulk of the exhaust capacity required for quickly reducing the pressure in the cylinders.

In the first section pressure control R1PC, four Bourdon tubes 53, 54, 55 and 56 are provided. As will appear, Bourdon tube 53 is used to preset the second section of the retarder. Its front contact $a$ is closed when the pressure in the first section exceeds 85 p.s.i., and its back contact $b$ is closed when the pressure in the first section is less than 35 p.s.i. The second Bourdon tube 54 is adapted to close its front contact $a$ when the pressure in the first section exceeds 82 p.s.i., and to close its back contact when the pressure is less than 75 p.s.i. This Bourdon tube is used to establish a pressure ceiling for medium cars, to preset the retarder for heavy cars, and to establish a stand-by pressure in the first section. The third Bourdon tube 55 closes its front contact $a$ when the pressure exceeds 35 p.s.i. and closes its back contact $b$ when the pressure goes below 35 p.s.i. This tube is used to establish a pressure ceiling for light cars and to preset the first section of the retarder for medium cars. The fourth Bourdon tube 56 closes its front contact $a$ when the pressure exceeds 22 p.s.i., and closes its back contact $b$ when the pressure is below 15 p.s.i. This tube is used to preset the first section of the retarder for light cars.

Figure 1E:
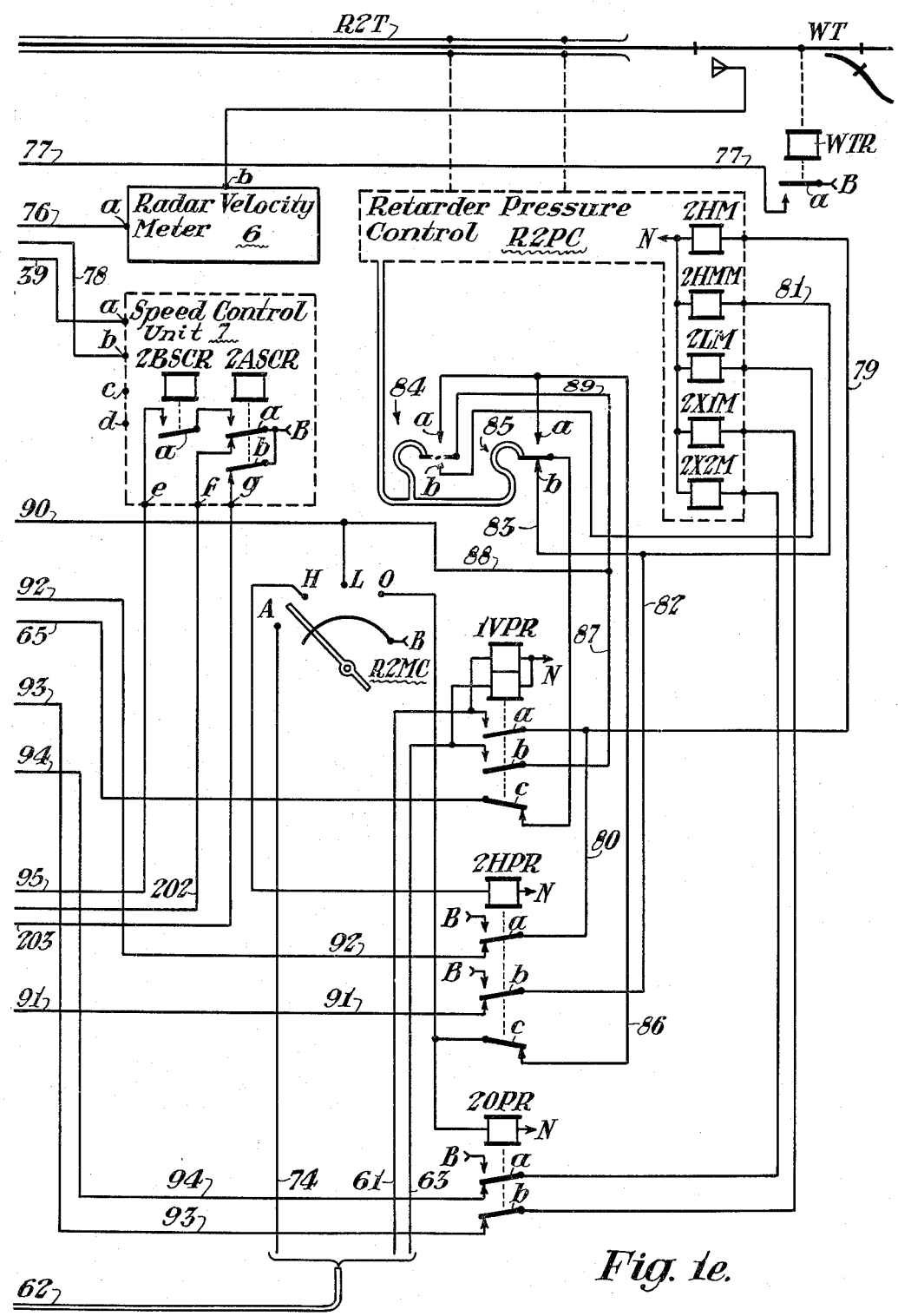

Referring now to FIG. 1e, pressure control unit R2PC is substantially identical with unit R1PC just described, and will, therefore, not be described in detail. Its intake valves are controlled by intake magnets 2HM, 2HMM and 2LM, and its exhaust valves are controlled by exhaust magnets 2X1M and 2X2M, in the same manner as the corresponding valves of the first section pressure control. The second section has only two Bourdon tubes, 84 and 85. Tube 84 is set to close its front contact $a$ at 37 p.s.i. or above, and to close its back contact $b$ at 30 p.s.i. or below. This tube is used to establish a maximum pressure for light cars and to preset the second section when contact $b$ of tube 53 in the first section is closed. Bourdon tube 85 is adjusted to close its front contact $a$ at 70 p.s.i. or above, and to close its back contact $b$ at pressures of 63 p.s.i. or below. Tube 85 is used to preset the second section of the retarder when the pressure in the first section is between 35 and 85 p.s.i., in which case tube 53 in the first section will close neither of its contacts $a$ or $b$, and to establish a stand-by pressure in the second section of the retarder.

The retarder is provided with two manual levers, a lever R1MC for the first section (FIG. 1b), and a lever R2MC for the second section (FIG. 1e). Each of these levers has a position A to which the levers are adjusted when the equipment is to be operated automatically, a position H which may be selected by the operator to provide a manual control suitable for medium or heavy cars, a position L which may be selected by the operator to provide a manual control suitable for light cars, and a position O to which the lever may be moved to open the retarder.

Levers R1MC (FIG. 1b) and R2MC (FIG. 1e) jointly control relay AP (FIG. 1d) when both levers are in their automatic positions. The energizing circuit for relay AP extends from terminal B of the battery over the contacts of lever R2MC in its A position, lead 74, cable 62, lead 74 (FIG. 1b), the contacts of lever R1MC in its automatic or A position, lead 73 (FIG. 1d), and through the winding of relay AP to terminal N of the battery. Relay AP is accordingly picked up when and only when both sections of the retarder are operating automatically.

Manual lever R1MC (FIG. 1b) controls two relays 1HPR and 10 PR.

Relay 1HPR is energized by an obvious circuit extending from terminal B of the battery over the contacts of the lever in its H position and through the winding of relay 1HPR to terminal N of the battery. This relay is accordingly energized whenever it is desired to apply manually a heavy braking pressure suitable for cuts of medium or heavy weight.

Relay 10PR has a first pickup circuit extending from terminal B of the battery over the contacts of lever R1MC in its O position through the winding of the relay to terminal N of the battery. The lever is set to position O when it is desired to open the retarder manually, and relay 10PR will be continuously energized while the lever is in this position. Relay 10PR has a second pickup circuit which extends from terminal B of the battery over back contact $c$ of relay R1TPP (FIG. 1a), lead 40, cable 9, cable 11, cable 12 (FIG. 1d), lead 40, front contact $h$ of relay AP, to be described, lead 41, cable 12, cable 11, cable 10 (FIG. 1a), lead 41, the back point of contact $f$ of relay RH1, the front point of contact $f$ of relay RL1, lead 42, front contact $a$ of Bourdon tube 56, closed when the pressure in the first section exceeds 22 p.s.i., lead 44, back contact $c$ of relay 1HPR, and through the winding of relay 10PR to terminal N of the battery. This circuit is employed to pick up relay 10PR before section R1T is occupied, but after it has been established that the weight of the next cut is light, to maintain the preset pressure of the first section below 22 p.s.i. Relay 10PR has a third pickup circuit which extends from terminal B of the battery over the contacts of lever R1MC in its L position, leads 45 and 46, front contact $a$ of Bourdon tube 55, closed when the pressure in the first section exceeds 37 p.s.i., lead 44, back contact $c$ of relay 1HPR, and through the winding of relay 10PR to terminal N of the battery. This circuit is used to establish a pressure ceiling of 37 p.s.i. for light cars under manual control. Relay 10PR has a fourth pickup circuit extending from terminal $e$ of speed control unit 4 (FIG. 1c), to be decsribed, which is energized when the speed of the cut is above a desired value to request more air pressure in the retarder, lead 24, lead 25, cable 21, lead 25 (FIG. 1a), front contact $b$ of relay R1TPP, lead 26, cable 9, cable 11, cable 13 (FIG. 1d), lead 26, front contact $a$ of relay AP, lead 15, cable 19, cable 16, cable 14, cable 13, cable 11, cable 10 (FIG. 1a), lead 15, the back point of contact $e$ of relay RH1, front contact $h$ of relay RL1, lead 47, lead 46, front contact $a$ of Bourdon tube 55, lead 44, back contact $c$ of relay 1HPR, and through the winding of relay 10PR to terminal N of the battery. This circuit is employed to enforce a pressure ceiling of 37 p.s.i. on light cars under automatic control. Relay 10PR has a fifth pickup circuit extending from terminal B of the battery over back contact $c$ of relay R1TPP (FIG. 1a), lead 40, cable 9, cable 11, cable 12 (FIG. 1d), lead 40, front contact $h$ of relay AP, lead 41, cable 12, cable 11, cable 10 (FIG. 1a), lead 41, the front point of contact $f$ of relay RH1, the front point of contact $g$ of relay RL1, lead 47, lead 46, front contact $a$ of Bourdon tube 55, lead 44, back contact $c$ of relay 1HPR, and through the winding of relay 10PR to terminal N of the battery. This circuit is used in presetting the first section of the retarder for medium weight cars to prevent the pressure from exceeding 37 p.s.i. Relay 10PR has a sixth pickup circuit extending from terminal $e$ of speed control unit 4 (FIG. 1c, to be described, over leads 24 and 25, cable 21, lead 25 (FIG. 1a), front contact $b$ of relay R1TPP, lead 26, cable 9, cable 11, cable 13 (FIG. 1d), lead 26, front contact $a$ of relay AP, lead 15, cable 19, cable 16, cable 14, cable 13, cable 11, cable 10 (FIG. 1a), lead 15, the front point of contact $e$ of relay RH1, the front point of contact $e$ of relay RL1, lead 43, front contact $a$ of Bourdon tube 54, closed when the pressure in the first section exceeds 82 p.s.i., lead 44, back contact $c$ of relay 1HPR, and through the winding of relay 10PR to terminal N of the battery. This circuit is used to establish a maximum pressure of 82 p.s.i. for medium weight cuts under automatic control. Relay 10PR has a seventh pickup circuit extending from terminal B of the battery over back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the back point of contact $f$ of relay RH1, the back point of contact $f$ of relay RL1, lead 43, front contact $a$ of Bourdon tube 54, lead 44, back contact $c$ of relay 1HPR, and through the winding of relay 10PR to terminal N of the battery. This circuit is used to establish a standby pressure in the retarder at a maximum of 82 p.s.i. Relay 10PR has an eighth pickup circuit extending from terminal B of the battery over back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the front point of contact $f$ of relay RH1, the back point of contact $g$ of relay RL1, lead 43, front contact $a$ of Bourdon tube 54, lead 44, back contact $c$ of relay 1HPR, and through the winding of relay 10PR to terminal N of the battery. This circuit is used in presetting the first section for heavy cars to prevent the initial pressure from exceeding 82 p.s.i. Lever R2MC controls two relays, 2HPR and 20PR (FIG. 1e).

Relay 2HPR has an obvious energizing circuit extending from terminal B of the battery over the contacts of lever R2MC in its H position and through the winding of relay 2HPR to terminal N of the battery. As will later appear, when this relay is energized, a relatively high pressure is applied to the actuating cylinders of pressure control unit R2PC to control medium or heavy cars under direct supervision by an operator.

Relay 20PR (FIG. 1e) has a first pickup circuit extending from terminal B of the battery over the contacts of lever R2MC in its O position and through the winding of the relay to terminal N of the battery. This relay is thus energized when it is desired to open the second section of the retarder, and, as will appear, completes circuits to maintain the large capacity exhaust magnet 2X2M energized at such times. Relay 20PR has a second pickup circuit extending from terminal B of the battery over front contact $c$ of relay AP (FIG. 1d), back contact $d$ of relays RL2 and RH2 in series, lead 65, back contact $c$ of relay 1VPR, to be described, front contact $a$ of Bourdon tube 85, closed when the pressure in the second section is above 70 p.s.i., lead 86, back contact $c$ of relay 2HPR, and through the winding of relay 20PR to terminal N of the battery. This circuit is used to establish a standby pressure in the second section below 70 p.s.i. Relay 20PR has a third pickup circuit which extends from terminal B of the battery over the contacts of lever R2MC in its L position, lead 88, lead 89, front contact $a$ of Bourdon tube 84, closed when the pressure in the second section exceeds 37 p.s.i., lead 86, back contact $c$ of relay 2HPR, and through the winding of relay 20PR to terminal N of the battery. This circuit is used during the manual control of light cuts to maintain the pressure in the second section below 37 p.s.i. Relay 20PR has a fourth pickup circuit extending from terminal e of the first section speed control unit 4 over leads 24 and 69, the front point of contact f of relay 1–2RC, front contact e of relay AP, the back point of contact c of relay RH2, front contact b of relay RL2, lead 90, lead 88, lead 89, front contact a of Bourdon tube 84, lead 86, back contact c of relay 2HPR, and through the winding of relay 20PR to terminal N of the battery. This circuit is employed during the time the cut occupies both sections of the retarder to maintain a ceiling of 37 p.s.i. for light cuts even though increased braking may then be requested by the first section speed control unit. Relay 20PR has a fifth pickup circuit which extends from terminal B of the battery over front contact c of relay AP (FIG. 1d), back contact d of relay RH2, back contact d of relay RL2, lead 64, back contact b of Bourdon tube 53 in the first section, lead 63, cable 62, lead 63 (FIG. 1e), front contact b of relay 1VPR (which will be energized if the circuit is energized to this point), leads 87 and 89, front contact a of Bourdon tube 84, lead 86, back contact c of relay 2HPR, and through the winding of relay 20PR to terminal N of the battery. This circuit is employed to maintain the preset pressure below 37 p.s.i. when the pressure in the first section is below 35 p.s.i.

Relay 1VPR (FIG. 1e) in the second section of the retarder, has two windings, either of which when energized is sufficient to open the back contacts and to close the front contacts of the relay. Since this relay may be of conventional construction, it will not be further described in detail. It has a first pickup circuit extending from terminal B of the battery over front contact c of relay AP (FIG. 1d), back contacts d of relays RH2 and RL2 in series, lead 64, front contact a of Bourdon tube 53 (FIG. 1b), closed when the pressure in the first section exceeds 85 p.s.i., lead 61, cable 62, lead 61 (FIG. 1e), and through the upper winding of relay 1VPR to terminal N of the battery. As will appear, this circuit is employed to apply pressure to the second section to preset the second section when the pressure in the first section is above 85 p.s.i. Relay 1VPR has a second pickup circuit which extends from front contact c of relay AP, back contacts d of relays RH2 and RL2 in series, lead 64, back contact b of Bourdon tube 53, closed when the pressure in the first section is below 35 p.s.i., lead 63, cable 62, lead 63 (FIG. 1e), and through the lower winding of relay 1VPR to terminal N of the battery. As will later appear, the pressure in the second section is maintained between 30 and 37 p.s.i. by circuits controlled by relay 1VPR when the pressure in the first section is below 35 p.s.i.

A speed control unit 4 (FIG. 1c) is provided for the first section of the retarder and at times also controls the second section, as will be described. A second speed control unit 7 (FIG. 1e) is provided for the second section of the group retarder. Since these speed control units are identical, only speed control unit 4 in FIG. 1c will be described in detail.

Speed control unit 4 may be of the type disclosed and claimed in the copending application of Richard D. Campbell and James A. Cook, Jr. Serial No. 676,732, filed on August 7, 1957, for Control Circuits, and assigned to the assignee of the present application. While the details of this unit do not form a part of our present invention, they are shown in FIG. 1c, and the operation thereof will be briefly described.

The reference numerals noted in the above-mentioned application of Campbell and Cook have been retained, except that in order to avoid confusion with other reference characters used in the system, they have been preceded by the letter R for resistor, C for capacitor, and V for vacuum tube. Moreover, the relays designated as 114 and 128 in the copending application are designated as 1BSCR and 1ASCR, respectively, to correspond to the designations used in a particular embodiment of our invention. Further, in some cases we have shown pairs of triodes enclosed in a single envelope, since we find it convenient to employ conventional dual triodes in many cases. However, separate halves of these triodes have been given designations corresponding to the designations of the copending application, accompanied by the prefix V.

The output from terminal a of radar velocity meter 5, to be described, as shown in FIG. 1c, and as described in detail in the above-mentioned copending application of Fitzsimmons and Robison, is basically a voltage which falls from a value of 100 volts when the radar unit is measuring a speed of 0 miles per hour to a value of 20 volts when the measured speed is 20 miles per hour. The values of leaving speed which are selected by leaving speed selector 2 (FIG. 1a) fall on a line defined by values of 0 volts for 0 miles per hour and 80 volts for 20 miles per hour. Obviously, therefore, when the measured voltage equals the selected voltage, the average value of these voltages over the entire speed range is 50 volts. The speed control unit functions to measure this value and to indicate any departure therefrom by a suitable combination of energized relays.

The output of radar velocity meter 5 appearing at terminal a is supplied over lead 22, cable 21, lead 22 (FIG. 1a), front contact d of relay R1TP, lead 23, cable 21, and lead 23 (FIG. 1c) to terminal b of speed control unit 4. The output of R1 speed selector unit 2, previously described, appearing at terminal a (FIG. 1a) is supplied over front contact e of relay R1TP, lead 20, cable 21, and lead 20 (FIG. 1c) to input terminal a of speed control unit 4.

The values appearing at terminals a and b of unit 4 are averaged by means of cathode follower stages V14 and V15 and summing resistors R26 and R27, as more fully described in the above noted application of Campbell and Cook. The average value of the speed selector voltage and the measured speed voltage appearing at the summing terminal of resistors R26 and R27 is supplied to the grid of amplifier stage V32.

At the same time, the radar speed signal appearing at the cathode of tube V14 is supplied through capacitor C35 to a differentiating and noise eliminating network comprising tubes V41, V45, V57, V51 and V67, as more fully described in the above-noted application of Campbell and Cook. The output of this network is a signal in accordance with the rate of change of the output of the radar velocity meter. A portion of this signal is applied to the grid of amplifier V102 through resistor R93, and another portion is differentiated in shunt capacitor C91 to add a small component proportional to the second time derivative of the radar signal. This signal adjusts the current flow through tube V102, thereby affecting the voltage drop through cathode resistor R110 and adjusting the plate current through V32 which occurs as a result of the averaged signal applied to its grid. The voltage at the plate of tube V32 will, therefore, be varied in accordance with the average of the signals from the speed selector and the radar velocity meter, as well as by components of the first and second time derivatives of the radar signal. The latter two signals may be omitted, if desired, in our present system, but in one embodiment are provided to improve the damping of the system.

The combined signal appearing at the plate of tube V32 is applied to the grid of amplifier V111 through a voltage divider comprising resistors R106 and R107, and in parallel to a second amplifier V125 through a voltage divider comprising resistors R122 and R123. Resistors R107 and R123 may be of the same value, for example, 6.8 megohms. Resistor R106 has a slightly lower value than does resistor R122. For example, according to one embodiment of our invention, R106 may be 4.7 megohms and R122 may be 5 megohms. Therefore, the voltage applied to the grid of tube V111 will always be slightly greater than the voltage applied to the grid of tube V125. The apparatus is initially adjusted so that when the average voltage applied to the grid of tube V32 equals 50 volts and with no time derivative signals applied to the grid of tube V102, tube V111 will be conducting and tube V125 will be either cut off or conducting a relatively small current. Relay 1ASCR is connected in the plate circuit of tube V111, so that when tube V111 is substantially conducting, it will be picked up. Relay 1BSCR is connected in the plate circuit of tube V125, such that it will be picked up if tube V125 is conducting substantially, but will be released if tube V125 is substantially nonconducting, or conducting a relatively small value of current.

As will be apparent from the preceding description, if the radar signal has a value in accordance with the speed selected by the speed selector unit, the average value of the two voltages will be 50 volts, which voltage will be applied to the grid of V32, causing tube V111 to conduct and tube V125 to be relatively non-conducting. Therefore, relay 1ASCR will be picked up and relay 1BSCR will be released. However, if, for example, the speed selector is adjusted for an output speed V1 of 15 miles per hour, corresponding to a voltage of 60 volts, and the output measured by the radar unit is 45 volts, corresponding to the lower speed of 13.7 miles per hour, the voltage to input V32 will be 52.5 volts, corresponding to an error signal ΔV of 2.5 volts. Accordingly, the plate current through V32 will increase and the voltage in the plate will drop, causing tube V111 to conduct and releasing relay 1ASCR. As will later appear, this will result in air being released from the retarder operating cylinders. The same result could be obtained if the actual speed of the car was equal to the desired speed, but the car was still decelerating such that a negative signal was applied to the grid of tube V102. In this event, the cathode voltage applied to grid V32 across common cathode resistor R100 will cause a drop in the plate voltage of V32 and cause relay 1ASCR to be released. On the other hand, if the measured speed is above the selected speed, the measured voltage would be lower than that which would give an average voltage of 50 volts at the grid of tube V32, the voltage at the plate of tube V32 would rise and both tubes V111 and V125 would be caused to conduct, causing both of relays 1BSCR and 1ASCR to be picked up, which, as will later appear, will result in more air being supplied to the control cylinders. The latter result could also be affected by acceleration of a car when its speed was equal to the selected speed, in which case a positive-going signal would be applied to the grid of tube V102, increasing the voltage at the cathode of tube V32 and causing a rise in its plate voltage.

It will appear from the above description that relays 1ASCR and 1BSCR are both released when the unit is not operating, when there is no car in the area viewed by the radar unit, when the cut has a speed below the selected speed, or when the combined speed and speed derivative signals indicate a need for less braking. When the measured speed and time derivatives of the measured speed together indicate that the cut is being properly retarded, relay 1ASCR is picked up and relay 1BSCR is released. When the speed of the cut is above the desired speed, or when the combined speed characteristics indicate the need for further braking, both relays 1BSCR and 1ASCR are picked up.

As has been described, two sets of exhaust valves are provided for each section of the retarder. Signals for energizing the large capacity valves such as 109 are supplied to terminal $g$ of unit 4, and signals for energizing the fast-acting valves such as 108 are supplied to terminal $f$ of unit 4, from terminal B of the battery over the back points of contact $b$ and contact $a$, respectively, of relay 1ASCR. A signal for energizing the intake valves is supplied to terminal $e$ of speed control unit 4 from terminal B of the battery over the front point of contact $a$ of relay 1ASCR and front contact $a$ of relay 1BSCR.

Terminals $a$ through $g$ of speed control unit 4 correspond to the same terminals of speed control unit 7 shown in FIG. 1e. Since this unit is identical with unit 4, it will not be described in detail.

The control circuits for the magnet valves of the retarders will now be described. Referring first to FIG. 1b, as previously described, retarder pressure control unit R1PC includes valve control magnets 1HM and 1HMM which control relatively fast-acting intake valves, intake magnet 1LM which controls an intake valve of smaller capacity and greater speed than the other intake valves, magnet 1X1M which controls a fast-acting low-capacity exhaust valve, and magnet 1X2M which controls a relatively slow-acting large-capacity exhaust valve.

Intake magnet 1HM has a first pickup circuit extending from terminal B of the battery over the front point of contact $a$ of relay 1HPR, lead 57, cable 49, lead 57, and through the winding of magnet 1HM to terminal N of the battery. This circuit is used in the manual control of heavy and medium cuts to assist in obtaining a high braking pressure. Magnet 1HM has a second pickup circuit which extends from terminal $e$ of speed control unit 4 (FIG. 1c) over leads 24 and 25, cable 21, lead 25 (FIG. 1a), front contact $b$ of relay R1TPP, lead 26, cable 9, cable 11, cable 13 (FIG. 1d), lead 26, front contact $a$ of relay AP, lead 15, cable 19, cable 16, cable 14, cable 13, cable 11, cable 10 (FIG. 1a), lead 15, front contact $d$ of relay RH1, back contact $d$ of relay RL1, lead 66, the back point of contact $a$ of relay 1HPR, lead 57, cable 49, lead 57, and through the winding of magnet 1HM to terminal N of the battery. This circuit is used to energize magnet 1HM in the control of heavy cuts when the combined characteristics of the cut demand more braking as evidenced by the energized condition of terminal $e$ of speed control unit 50.

Magnet 1HMM has a first pickup circuit extending from terminal B of the battery over the front point of contact $b$ of relay 1HPR, lead 51, lead 52, cable 49, lead 52, and through the winding of relay 1HMM to terminal N of the battery. By this circuit, magnet 1HMM is energized in conjunction with magnet 1HM to bring about a rapid increase in braking pressure for the manual control of medium or heavy cuts. Magnet 1HMM has a second pickup circuit extending from terminal $e$ of speed control unit 4 over leads 24 and 25, cable 21, lead 25 (FIG. 1a), front contact $b$ of relay R1TPP, lead 26, cable 9, cable 11, cable 13 (FIG. 1d), lead 26, front contact $a$ of relay AP, lead 15, cable 19, cable 16, cable 14, cable 13, cable 11, cable 10 (FIG. 1a), lead 15, the front point of contact $e$ of relay RH1, the back point of contact $b$ of relay 1HPR, leads 51 and 52, cable 49, lead 52, and through the winding of relay 1HMM to terminal N of the battery. This circuit is employed to energize magnet 1HMM together with magnet 1HM in the automatic control of heavy cuts. Magnet 1HMM has a third pickup circuit which extends from terminal $e$ of speed control unit 4 over leads 24 and 25, cable 21, lead 25 (FIG. 1a), front contact $b$ of relay R1TPP, lead 26, cable 9, cable 11, cable 13 (FIG. 1d), lead 26, front contact $a$ of relay AP, lead 15, cable 19, cable 16, cable 14, cable 13, cable 11, cable 10 (FIG. 1a), lead 15, the front point of contact $e$ of relay RH1, the front point of contact $e$ of relay RL1, lead 43, back contact $b$ of Bourdon tube 54, closed when the pressure in the first section is below 75 p.s.i., lead 50, lead 52, cable 49, lead 52, and through the winding of magnet 1HMM to terminal N of the battery. This circuit is used in the automatic control of medium weight cuts to permit an increase in pressure when requested by the energized condition of speed control terminal $e$ if the pressure in the first section is below 75 p.s.i. Magnet 1HMM has a fourth pickup circuit which extends from terminal B of the battery over back contact c of relay R1TPP (FIG. 1a), lead 40, cable 9, cable 11, cable 12 (FIG. 1d), lead 40, front contact h of relay AP, lead 41, cable 12, cable 11, cable 10 (FIG. 1a), lead 41, the back point of contact f of relay RH1, the back point of contact f of relay RL1, lead 43, back contact b of Bourdon tube 54, lead 50, lead 52, cable 49, lead 52, and through the winding of magnet 1HMM to terminal N of the battery. This circuit is used to establish a standby pressure of at least 75 p.s.i. in the first section. Magnet 1HMM has a fifth pickup circuit extending from terminal B of the battery over back contact c of relay R1TPP, lead 40, cable 9, cable 11, cable 12 (FIG. 1d), lead 40, front contact h of relay AP, lead 41, cable 12, cable 11, cable 10 (FIG. 1a), lead 41, the front point of contact f of relay RH1, the back point of contact g of relay RL1, lead 43, back contact b of Bourdon tube 54, lead 50, lead 52, cable 49, lead 52, and through the winding of magnet 1HMM to terminal N of the battery. This circuit is used to adjust the first section of the retarder to at least 75 p.s.i. when the approach of a heavy cut is indicated.

Magnet 1LM (FIG. 1b) has a first pickup circuit extending from terminal B of the battery over back contact c of relay R1TPP (FIG. 1a), lead 40, cable 9, cable 11, cable 12 (FIG. 1d), lead 40, front contact h of relay AP, lead 41, cable 12, cable 11, cable 10 (FIG. 1a), lead 41, the back point of contact f of relay RH1, the front point of contact f of relay RL1, lead 42, back contact b of Bourdon tube 56, closed when the pressure is below 15 p.s.i., lead 48, cable 49, lead 48, and through the winding of magnet 1LM to terminal N of the battery. This circuit is used to preset the first section to at least 15 p.s.i. on the approach of a light weight cut. Magnet 1LM has a second pickup circuit extending from terminal B of the battery over the contacts of lever R1MC in its L position, leads 45 and 46, back contact b of Bourdon tube 55, lead 48, cable 49, lead 48, and through the winding of magnet 1LM to terminal N of the battery. This circuit is used to maintain the pressure in the first section above 30 p.s.i. in the manual control of light cuts. Magnet 1LM has a third pickup circuit extending from terminal B of the battery over back contact c of relay R1TPP, lead 40, cable 9, cable 11, cable 12 (FIG. 1d), lead 40, front contact h of relay AP, lead 41, cable 12, cable 11, cable 10 (FIG. 1a), lead 41, the front point of contact f of relay RH1, the front point of contact g of relay RL1, lead 47, lead 46, back contact b of Bourdon tube 55, closed when the pressure in the first section is below 30 p.s.i., lead 48, cable 49, lead 48, and through the winding of magnet 1LM to terminal N of the battery. This circuit is used to preset the first section to at least 30 p.s.i. Magnet 1LM has a fourth pickup circuit extending from terminal e of speed control unit 4 over leads 24 and 25, cable 21, lead 25 (FIG. 1a), front contact b of relay R1TPP, lead 26, cable 9, cable 11, cable 13 (FIG. 1d), lead 26, front contact a of relay AP, lead 15, cable 19, cable 16, cable 14, cable 13, cable 11, cable 10 (FIG. 1a), lead 16, the back point of contact e of relay RH1, front contact h of relay RL1, lead 47, lead 46, back contact b of Bourdon tube 55, lead 48, cable 49, lead 48, and through the winding of magnet 1LM to terminal N of the battery. This circuit is used in the automatic control of light cuts to maintain the pressure above 30 p.s.i. when the speed control unit requests more braking.

Exhaust magnet 1X1M (FIG. 1b) has an energizing circuit extending from terminal f of speed control unit 4 (FIG. 1c), which is energized when it is desired to reduce the breaking force during automatic control, over leads 36 and 35, front contact b of relay AP, lead 34, cable 19, cable 16, cable 14, cable 13, cable 11, cable 9 (FIG. 1a), lead 34, front contact b of relay RL1 and front contact b of relay RH1 in multiple, to provide a circuit path for any weight registration other than 0, lead 60, back contact a of relay 10PR, lead 58, cable 49, lead 58, and through the winding of magnet 1X1M to terminal N of the battery. Magnet 1X1M is accordingly energized during automatic control when combined speed characteristics of the cut are less than the desired value.

Exhaust magnet 1X2M (FIG. 1b) has a first energizing circuit extending from terminal B of the battery over the front point of contact b of relay 10PR, lead 59, cable 49, lead 59, and through the winding of magnet 1X2M to terminal N of the battery. Magnet 1X2M is accordingly energized under any of the conditions previously described in which relay 10PR is energized. Exhaust magnet 1X2M has a second energizing circuit extending from terminal g of speed control unit 4, which is energized when the combined speed characteristics of a cut under automatic control are below the desired value, over leads 200 and 72, front contact d of relay AP, lead 71, cable 19, cable 16, cable 14, cable 13, cable 11, cable 10 (FIG. 1a), lead 71, front contacts i of relay RL1 and g of relay RH1 in multiple, lead 70, the back point of contact b of relay 10PR, lead 59, cable 49, lead 59, and through the winding of magnet 1X2M to terminal N of the battery. Magnet 1X2M is accordingly energized in parallel with magnet 1X1M under automatic control when it is desired to reduce the braking pressure. As previously described, under these conditions, magnet 1X1M provides a rapid response which is quickly sensed by the velocity meter, and magnet 1X2M provides additional capacity, although at a slower rate.

Referring now to the second section pressure control unit R2PC, as shown in FIG. 1e, the second section magnet valve control circuits will be described.

Intake magnet 2HM (FIG. 1e) has a first energizing circuit extending from terminal B of the battery over the front point of contact a of relay 2HPR, leads 80 and 79, and through the winding of magnet 2HM to terminal N of the battery. This circuit is employed to assist in increasing and maintaining a high pressure during the manual control of heavy and medium cuts. Magnet 2HM has a second energizing circuit which extends from terminal e of the first section speed control unit 4 (FIG. 1c) over leads 24 and 69, the front point of contact f of relay 1–2RC, front contact e of relay AP, front contact b of relay RH2, back contact c of relay RL2, lead 92, the back point of contact a of relay 2HPR, leads 80 and 79, and through the winding of magnet 2HM to terminal N of the battery. This circuit is used during the automatic control of heavy cars when additional braking is requested by the first section speed control unit, during the control of the second section by the first section speed control when both sections are occupied by a cut. Magnet 2HM has a third energizing circuit extending from terminal B of the battery over front contact c of relay AP (FIG. 1d), back contacts d of relays RH2 and RL2 in series, lead 64, front contact a of Bourdon tube 53 (FIG. 1b), lead 61, cable 62, lead 61 (FIG. 1e), front contact a of relay 1VPR, lead 79, and through the winding of magnet 2HM to terminal N of the battery. This circuit is employed to maintain the standby pressure in the second section at the highest possible value (for example, 110 p.s.i.) if the pressure in the first section exceeds 85 p.s.i. Magnet 2HM has a fourth energizing circuit extending from terminal e of speed control unit 7 (FIG. 1e) over lead 95, the back point of contact f of relay 1–2RC, front contact e of relay AP, front contact b of relay RH2, back contact c of relay RL2, lead 92, the back point of contact a of relay 2HPR, leads 80 and 79, and through the winding of magnet 2HM to terminal N of the battery. This circuit is used when a cut has cleared the first section of the group retarder to assist in rapidly increasing the braking pressure for heavy cuts when requested by the energized condition of terminal e of second section speed control unit 7.

Magnet 2HMM (FIG. 1e) has a first energizing circuit which extends from terminal B of the battery over the front point of contact b of relay 2HPR, leads 82 and 81, and through the winding of magnet 2HMM to terminal N of the battery. Magnet 2HMM is accordingly energized in parallel with magnet 2HM during the manual control of heavy and medium cuts. Magnet 2HMM has a second energizing circuit which extends from terminal e of first section speed control unit 4 over leads 24 and 69 to the front point of contact f of relay 1–2RC, front contact e of relay AP, the front point of contact c of relay RH2, lead 91, the back point of contact b of relay 2HPR, leads 82 and 81, and through the winding of magnet 2HMM to terminal N of the battery. Magnet 2HMM is accordingly energized during the control of the second section by the first section speed control, when terminal e of speed control unit 4 is energized and the cut is of either medium or heavy weight. Magnet 2HMM has a third energizing circuit extending from terminal B of the battery over front contact c of relay AP (FIG. 1d), back contacts d of relays RH2 and RL2 in series, lead 65, back contact c of relay 1VPR, back contact b of Bourdon tube 85, closed when the pressure is below 63 p.s.i., leads 83 and 81, and through the winding of magnet 2HMM to terminal N of the battery. This circuit keeps the pressure in the second section above 63 p.s.i. under standby conditions. Magnet 2HMM has a fourth energizing circuit which extends from terminal e of speed control unit 7 (FIG. 1e) over lead 95, the back point of contact f of relay 1–2RC, front contact e of relay AP, the front point of contact c of relay RH2, lead 91, the back point of contact b of relay 2HPR, leads 82 and 81, and through the winding of magnet 2HMM to terminal N of the battery. This circuit is employed in the automatic control of either heavy or medium cuts, after the cuts have cleared the first section, when additional braking pressure is requested by the second section speed control unit 7.

Magnet 2LM has a first energizing circuit which extends from terminal B of the battery over the contacts of lever R2MC in its L position, leads 88 and 89, back contact b of Bourdon tube 84, closed when the pressure in the second section is below 30 p.s.i., and through the winding of magnet 2LM to terminal N of the battery. This circuit keeps the pressure in the second section above 30 p.s.i. during the manual control of light cuts. Magnet 2LM has a second energizing circuit which extends from terminal e of the first section speed control unit 4 over leads 24 and 69, the front point of contact f of relay 1–2RC, front contact e of relay AP, the back point of contact c of relay RH2, front contact b of relay RL2, leads 90, 88 and 89, back contact b of Bourdon tube 84, and through the winding of magnet 2LM to terminal N of the battery. This circuit is employed in the automatic control light cuts while such cuts span both sections, when the first section speed control requests more braking and the pressure in the second section is below 30 p.s.i. Magnet 2LM has a third energizing circuit which extends from terminal e of speed control unit 7 (FIG. 1e) over lead 95, the back point of contact f of relay 1–2RC, front contact e of relay AP, the back point of contact c of relay RH2, front contact b of relay RL2, leads 90, 88 and 89, back contact b of Bourdon tube 84, and through the winding of magnet 2LM to terminal N of the battery. This circuit is used, for light cuts, in the control of the second section from the second section speed control unit, after the cut has cleared the first section, to maintain it at a pressure above 30 p.s.i. when increased pressure is requested by the speed control unit. Magnet 2LM has a fifth energizing circuit which extends from terminal B of the battery over front contact c of relay AP (FIG. 1d), back contacts d of relays RH2 and RL2 in series, lead 64, back contact b of Bourdon tube 53 (FIG. 1b), closed when the pressure in the first section is below 35 p.s.i., lead 63, cable 62, lead 63 (FIG. 1e), front contact b of relay 1CPR, leads 87 and 89, back contact b of Bourdon tube 84, closed when the pressure in the second section is below 30 p.s.i., and through the winding of magnet 2LM to terminal N of the battery. This circuit is used to preset the second section and maintain its pressure above 30 p.s.i. when the pressure in the first section is below 35 p.s.i.

Exhaust magnet 2X1M (FIG. 1e) has a first energizing circuit which extends from terminal f of first section speed control unit 4 over leads 36 and 37, the front point of contact e of relay 1–2RC, front contact f of relay AP, front contacts f of relays RL2 and RH2 in multiple, lead 93, back contact b of relay 20PR, and through the winding of magnet 2X1M to terminal N of the battery. Magnet 2X1M is energized by this circuit to cause a relatively rapid decrease in pressure in the automatic control of cuts of light, medium or heavy weight when both sections of the retarder are occupied and reduced pressure is requested by the first section speed control unit 4. Magnet 2X1M has a second energizing circuit which extends from terminal f of the second section speed control unit 7 (FIG. 1e) over lead 202, the back point of contact e of relay 1–2RC, front contact f of relay AP, front contacts f of relays RL2 and RH2 in multiple, lead 93, back contact b of relay 20PR, and through the winding of magnet 2X1M to terminal N of the battery. This circuit functions the same as the previously traced circuit, except that it is operative after the cut has cleared the first section of the group retarder and is being controlled by the second section speed control unit 7.

Exhaust magnet 2X2M (FIG. 1e) has a first energizing circuit extending from terminal B of the battery over the front point of contact a of relay 20PR, and through the winding of magnet 2X2M to terminal N of the battery. This circuit is employed to exhaust the retarder actuating cylinders under the various conditions described above in which relay 20PR is energized. Magnet 2X2M has a second energizing circuit which extends from terminal g of speed control unit 4 (FIG. 1c) over leads 200 and 201, the front point of contact d of relay 1–2RC, front contact g of relay A, front contacts e of relays RL2 and RH2 in multiple, lead 94, the back point of contact a of relay 20PR, and through the winding of magnet 2X2M to terminal N of the battery. This circuit is employed to obtain reduced pressure in the automatic operation of the second section by the first section speed control. Magnet 2X2M has a third energizing circuit extending from terminal g of speed control unit 7 (FIG. 1e) over lead 203, the back point of contact d of relay 1–2RC, front contact g of relay AP, front contacts e of relays RL2 and RH2 in multiple, lead 94, the back point of contact a of relay 20PR, and through the winding of magnet 2X2M to terminal N of the battery. This circuit is used in the automatic control of the second section from the second section speed control unit 7 after a cut has cleared the first section.

The construction and arrangement of this embodiment of our invention having been described, the operation of the apparatus under various typical conditions will now be described.

Manual operation of the first section of the retarder will be first considered. For the manual control of heavy cuts, lever R1MC (FIG. 1b) is moved to its H position, causing relay 1HPR to pick up and magnets 1HM and 1HMM to be energized in parallel by their previously traced circuits. The lever is left in the H position until the desired amount of braking has been obtained. For light cuts the operation is semi-automatic. The lever is moved to its L position, energizing the movable contact member of Bourdon tube 55 over leads 45 and 46. When the pressure rises above 37 p.s.i., front contact a of this Bourdon tube will close, and relay 10PR will be picked up over its previously traced circuit including lead 44 and back contact c of relay 1HPR. Exhaust magnet 1X2M will then be energized over its previously traced circuit including front contact b of relay 10PR, and the pressure will be reduced. Should the pressure fall below 30 p.s.i., back contact b of Bourdon tube 55 will be closed, and intake magnet 1LM will be energized, causing the pressure to increase. When it is desired to reduce the pressure manually, lever R1MC may be moved to its O position, causing relay 10PR and consequently exhaust magnet 1X2M to be energized, thus reducing the pressure to a desired value or opening the retarder completely.

The manual operation of the second section of the retarder is similar to that described for the first section. With lever R2MC in its H position, relay 2HPR is picked up and both intake magnets 2HM and 2HMM will be energized in parallel to bring about a rapid increase in pressure to a relatively high sustained value. When the lever is moved to its L position, the movable contact member of Bourdon tube 84 is energized. Should the pressure increase above 37 p.s.i., front contact $a$ of Bourdon tube 84 will be closed, and relay 20PR will be picked up over its previously traced circuit including back contact $c$ of relay 2HPR. Exhaust magnet 2X2M will then be energized, causing the pressure to decrease. Should the pressure fall below 30 p.s.i., back contact $b$ of Bourdon tube 84 will close, causing intake magnet 2LM to be energized and raising the pressure. In the O position of lever R2MC, relay 20PR will be picked up, exhaust magnet 2X2M will be energized, the pressure will then be reduced, and the retarder will ultimately open completely if so desired.

With no cars occupying the retarder, and before any weight information has been registered in relays RL1 and RH1, if the retarder is set for automatic operation by placing levers R1MC and R2MC in their automatic or A positions, both sections of the retarder will be maintained at a standby pressure.

In the first section of the retarder, the standby pressure is controlled between 75 and 82 p.s.i. by the action of Bourdon tube 54. The movable contact of this Bourdon tube is energized over a previously traced circuit including back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the back point of contact $f$ of relay RH1 and the back point of contact $f$ of relay RL1 in series, and lead 43. Should the pressure increase above 82 p.s.i., front contact $a$ of Bourdon tube 54 will close and relay 10PR will be energized over its previously traced circuit including back contact $c$ of relay 1HPR, causing exhaust magnet 2X2M to be energized and the pressure to be reduced. Should the pressure fall below 75 p.s.i., back contact $b$ of Bourdon tube 54 will close, causing intake magnet 1HMM to be energized until the pressure is increased above 75 p.s.i.

In the second section of the retarder, standby pressure is established between 63 and 70 p.s.i. by Bourdon tube 85. The movable contact of this Bourdon tube is energized over a previously traced circuit which extends from terminal B of the battery over front contact $c$ of relay AP, back contacts $d$ of relays RH2 and RL2 in series, lead 65, and back contact $c$ of relay 1VPR to the movable contact of Bourdon tube 85. When the pressure rises above 70 p.s.i., front contact $a$ of Bourdon tube 65 is closed and relay 20PR will be energized over its previously traced circuit including back contact $c$ of relay 2HPR. Exhaust magnet 2X2M will then be energized to reduce the pressure. Should the pressure fall below 63 p.s.i., back contact $b$ of tube 85 will be closed, and magnet 2HMM will be energized to restore the pressure to the desired range.

As soon as a weight is registered in relays RL1 and RH1, and before section R1T is occupied, in the automatic operation of our equipment the retarders will preset to a pressure value in accordance with the weight of the next cut.

For light cars, the pressure in the first section is preset between 15 and 22 p.s.i. by the action of Bourdon tube 56. The movable contact of this Bourdon tube will be energized over a previously traced circuit including back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the back point of contact $f$ of relay RH1, the front point of contact $f$ of relay RL1, and lead 42. Should the pressure rise above 22 p.s.i., relay 10PR will be energized over its previously traced circuit including front contact $a$ of Bourdon tube 56 and back contact $c$ of relay 1HPR. Exhaust magnet 1X2M will then be energized over the front point of contact $b$ of relay 10PR to reduce the pressure. Should the pressure fall below 15 p.s.i., back contact $b$ of Bourdon tube 56 would close, and magnet 1LM will be energized to restore the pressure to the desired range.

For medium weight cars, when relays RL1 and RH1 are both picked up, the pressure in the first section is preset between 30 and 37 p.s.i. by the action of Bourdon tube 55. The movable contact of this Bourdon tube is energized at this time over a circuit including back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the front point of contact $f$ of relay RH1, the front point of contact $g$ of relay RL1 and leads 47 and 46. Should the pressure rise above 37 p.s.i., front contact $a$ of Bourdon tube 55 will be closed and relay 10PR will be energized over its previously traced circuit, causing exhaust magnet 1X2M to be energized and reducing the pressure. Should the pressure fall below 30 p.s.i., magnet 1LM will be energized over back contact $b$ of Bourdon tube 55 to restore the pressure to the desired range.

For heavy cars, the pressure in the first section is preset between 75 and 82 p.s.i. by the action of Bourdon tube 54. The movable contact of this Bourdon tube is energized over a previously traced circuit including back contact $c$ of relay R1TPP, lead 40, cable 9, cable 11, cable 12 (FIG. 1d), lead 40, front contact $h$ of relay AP, lead 41, cable 12, cable 11, cable 10 (FIG. 1a), lead 41, the front point of contact $f$ of relay RH1, the back point of contact $g$ of relay RL1, and lead 43. Should the pressure then rise above 82 p.s.i., relay 10PR will be energized over its previously traced circuit and exhaust magnet 1X2M will be energized to reduce the pressure to the desired range. Should the pressure fall below 75 p.s.i., magnet 1HMM will be energized over back contact $b$ of tube 54 to increase the pressure to the desired range.

The second section of the retarder is preset to a range between 30 and 37 p.s.i. when the pressure in the first section is below 35 p.s.i. At such times, the movable contact of Bourdon tube 53 in the first section is energized over a previously traced circuit including front contact $c$ of relay AP, back contacts $d$ of relays RH2 and RL2 in series, and lead 64. With the pressure in the first section below 35 p.s.i., back contact $b$ of Bourdon tube 53 will be closed, and the movable contact of Bourdon tube 84 will be energized over a circuit extending from back contact $b$ of tube 53 over lead 63, cable 62, lead 63 (FIG. 1e), front contact $b$ of relay 1VPR, which will now be picked up, and leads 87 and 89. Should the pressure in the second section increase above 37 p.s.i., from contact $a$ of Bourdon tube 84 will close, which will cause relay 20PR to be picked up. Exhaust magnet 2X2M will then be picked up over the front point of contact $a$ of relay 20PR, and the pressure will be reduced. Should the pressure in the second section drop below 30 p.s.i., back contact $b$ of Bourdon tube 84 will be closed, and intake magnet 2LM will be energized to increase the pressure.

With the movable contact of Bourdon tube 53 in the first section energized as just described, should the pressure in the first section be above 85 p.s.i., magnet 2HM in the second section will be energized over a circuit extending from front contact $a$ of tube 53 over lead 61, cable 62, lead 61 (FIG. 1e), and through the upper winding of relay 1VPR to terminal N of the battery, causing relay 1VPR to pick up, thus causing a circuit to be completed from lead 61 over front contact *a* of relay 1VPR and lead 79 to intake magnet 2HM. The pressure will thus be increased to its highest possible value: for example, 110 p.s.i.

When the pressure in the first section is between 35 and 85 p.s.i., the circuits just traced will be interrupted. Under these conditions, the second section of the group retarder will be preset between 63 and 70 p.s.i. by the action of Bourdon tube 85. The movable contact of this Bourdon tube is energized at this time over a circuit including front contact *c* of relay AP, back contacts *d* of relays RH2 and RL2 in series, lead 65, and back contact *c* of relay 1VPR. Should the pressure rise above 70 p.s.i., front contact *a* of tube 85 will be closed, causing relay 20PR to be picked up, and exhaust magnet 2X2M will be energized over the circuits previously described to reduce the pressure to the desired range. Should the pressure fall below 63 p.s.i., back contact *b* of tube 85 will be closed, and intake magnet 2HMM will be energized to increase the pressure to the desired range.

Automatic operation of the retarder to control a light weight cut will now be described. It will be assumed that both sections of the retarder are in their automatic conditions with the levers R1MC and R2MC set to their automatic or A positions. Relay AP will be accordingly energized. It will be further assumed that weight register 1, previously described, has functioned to register the light weight of the cut and that relay RLP is energized and relay RHP is released. At this time, the remainder of the apparatus may be assumed to be in the condition shown in the drawings.

Next, let it be assumed that the cut occupies track section AT, causing track relay ATR to be released and to energize relay ATP over its back contact *a*.

With relay ATP energized, relay RL1 will now be picked up over front contact *a* of relay RLP, front contact *b* of relay ATP, and back contact *b* of relay GAEC. Relay RH1 will remain released, since its previously traced pickup circuit will be interrupted at the open front point of contact *a* of relay RHP.

With relay RL1 energized and relay RH1 released, the first section of the retarder will now be preset as previously described between a pressure of 15 and 22 p.s.i., so that back contact *b* of Bourdon tube 53 will be closed. The second section of the group retarder will accordingly be maintained at a preset pressure of between 30 and 37 p.s.i. by the action of Bourdon tube 84, as previously described.

It will be assumed that R1 leaving speed selector 2 and R2 leaving speed selector 3 have been actuated, and that appropriate values of voltage corresponding to the desired leaving speed of the cut from the retarder appear between their output terminals *a* and their grounded terminals *b*.

As the cut moves into section R1T, track relay R1TR will be released, closing its back contact *a* and causing relay R1TP to be picked up. With relay R1TP picked up, relay R1TPP will be picked up over the front point of contact *c* of relay R1TP.

At the same time, the previously traced stick circuit for relay RL1, including its own front contact *a* and front contact *b* of relay R1TP, will be completed. The speed of the cut will be measured by retarder velocity meter 5, and a voltage proportional to the measured speed will be supplied from output terminal *a* of velocity meter 5 over lead 22, cable 21, lead 22 (FIG. 1*a*), front contact *d* of relay R1TP, lead 23, cable 21, and lead 23 to input terminal *b* of speed control unit 4.

The output from terminal *a* of R1 leaving speed selector 2 appearing at terminal *a* will be connected to terminal *a* of speed control unit 4 over front contact *e* of relay R1TP, lead 20, cable 21, and lead 20 (FIG. 1*c*).

Speed control unit 4 will now function to compare the speed of the cut and its higher time derivatives with the desired speed, as previously described, such that when the combined characteristics of the cut are above the desired speed, terminal *e* of unit 4 will be energized, and when the combined characteristics fall below the desired value, terminals *f* and *g* will be energized. When the speed characteristics are as desired, none of the terminals of the speed control unit will be energized.

With relay R1TPP energized as described, its previously traced stick circuit including back contact *e* of relay R1EC (FIG. 1*d*), lead 31, cable 18, cable 16, cable 14, cable 13, cable 11, cable 9 (FIG. 1*a*), lead 31, and its own front contact *a* will be completed. At the same time, the circuit for presetting the first section of the retarder will be interrupted at the open back point of contact *c* of relay R1TPP. The retarder will now be controlled from terminals *e*, *f*, and *g* of speed control unit 4.

When terminal *e* of speed control unit 4 is energized, the movable arm of Bourdon tube 55 will be energized over the previously traced circuit extending from terminal *e* of speed control unit 4 and including leads 24 and 25, cable 21, lead 25 (FIG. 1*a*), front contact *b* of relay R1TPP, lead 26, cable 9, cable 11, cable 13 (FIG. 1*d*), lead 26, front contact *a* of relay AP, lead 15, cable 19, cable 16, cable 14, cable 13, cable 11, cable 10 (FIG. 1*a*), lead 15, the back point of contact *e* of relay RH1, front contact *h* of relay RL1, lead 47, and lead 46.

Under the initial conditions previously described, with the retarder preset between 15 and 22 p.s.i., back contact *b* of Bourdon tube 55 will be closed. Accordingly, intake magnet 1LM will be energized over lead 48 and the pressure will be increased. When the pressure exceeds 30 p.s.i., back contact *b* of tube 55 will be open. Should the pressure exceed 37 p.s.i., front contact *a* of tube 55 will be closed. Relay 10PR will then pick up over lead 44 and back contact *c* of relay 1HPR. Exhaust magnet 1X2M will be energized over front contact *b* of relay 10PR and lead 59 until the pressure is reduced below 37 p.s.i.

Should the combined speed characteristics decrease below the desired value, terminals *f* and *g* of speed control unit 4 will be energized. Exhaust magnet 1X1M will then be energized over its previously traced circuit extending from terminal *f* of speed control unit 4 over leads 36 and 35, front contact *b* of relay AP, lead 34, cable 19, cable 16, cable 14, cable 13, cable 11, cable 9 (FIG. 1*a*), lead 34, front contact *b* of relay RL1, lead 60, back contact *a* of relay 10PR, lead 58, cable 49, and lead 58 to the winding of magnet 1X1M, and thence to terminal N of the battery. The valve control by magnet 1X1M will respond quite rapidly, causing a relatively slight decrease in braking force which will rapidly be reflected in the higher time derivatives of the speed of the cut, to prevent over-correction and consequent hunting of the system. Exhaust magnet 1X2M will be energized from terminal *g* of speed control unit 50 over leads 200 and 72, front contact *d* of relay AP, lead 71, cable 19, cable 16, cable 14, cable 13, cable 11, cable 10 (FIG. 1*a*), lead 71, front contact *i* of relay RL1, lead 70, the back point of contact *b* of relay 10PR, and lead 59. The valve control by this magnet will provide a large exhaust capacity if needed to reduce the combined speed characteristics of the cut.

As the cut moves into section R2T, relay 1–2RC will be picked up and the weight information stored in relays RL1 and RH1 will be transferred to relays RL2 and RH2 over their previously described circuits. In particular, when track section R2T is occupied, track relay R2TR will be released, and relay R2TP will be energized over back contact *a* of relay R2TR. Relay 1–2RC will then be picked up over front contact *d* of relay R2TP and back contact *b* of relay R1EC. The previously traced pickup circuit for relay RH2 will be interrupted at the open front point of contact *c* of relay RH1, and this relay will accordingly remain released. Relay RL2 will be picked up over a circuit extending from terminal B of the battery over front contact *b* of relay 1–2RC, lead 32, cable 17, cable 14, cable 13, cable 11, cable 9 (FIG. 1*a*), lead 32, front contact *c* of relay RL1, lead 33, cable 9, cable 11, cable 13 (FIG. 1*d*), cable 14, cable 17, lead 33, through the winding of relay RL2 to terminal N of the battery.

When the cut clears section AT, relay ATR will be picked up and relay ATP will be released. Relay GAEC will now be picked up over its previously traced circuit including back contact *a* of relay ATP, front contact *a* of relay R1TP, the winding of relay GAEC, lead 8, cable 9, cable 11, cable 13 (FIG. 1*d*), cable 14, cable 16, cable 18, lead 8, and over back contact *d* of relay R1EC to terminal N of the battery. With relay GAEC picked up to indicate that the cut has cleared the approach track section, the weight transfer circuits from weight register 1 to relays RL1 and RH1 are interrupted at the open back points of contacts *b* and *c* of relay GAEC as well as at the open front points of contacts *b* and *c* of relay ATP. The weight register is then free to accept weight information for a succeeding cut without interrupting the operation of the retarder. The condition of relays RL1 and RH1 is maintained at this time, relay RH1 being deenergized and relay RL1 being energized over its stick circuit including front contact *b* of relay R1TP.

As soon as the cut occupies section R2T and relay R2TP is energized as described above, the value of leaving speed appearing at output terminal *a* of R2 leaving speed selector 3 is supplied over lead 38, cable 9, cable 11, cable 13 (FIG. 1*d*), cable 14, cable 17, lead 38, front contact *f* of relay R2TP, and lead 39 to terminal *a* of speed control unit 7 (FIG. 1*e*). At the same time, the output appearing at terminal *a* of velocity meter 6 will be supplied to input terminal *b* of speed control unit 7 over lead 76, front contact *a* of relay R2TP, and lead 78. Speed control unit 7 will accordingly commence to follow the action of the cut, but will as yet be ineffective to control the second section.

During the joint occupancy of sections R1T and R2T, the second section pressure control unit R2PC is controlled from the first section speed control unit 4. Should terminal *e* of speed control unit 4 be energized, the movable contact of Bourbon tube 84 will be energized over a circuit including leads 24 and 69, the front point of contact *f* of relay 1–2RC, front contact *e* of relay AP, the back point of contact *c* of relay RH2, front contact *b* of relay RL2, leads 90, 88 and 89. The action of this tube will maintain the pressure between 30 and 37 p.s.i. while terminal *e* of speed control unit 4 is energized. Should the pressure exceed 37 p.s.i., relay 20PR and exhaust magnet 2X2M will be energized, as previously described, to reduce the pressure. Should the pressure go below 30 p.s.i., back contact *b* of tube 84 will be closed and intake magnet 2LM will be energized.

If terminals *f* and *g* of speed control unit 4 are energized, exhaust magnets 2X2M and 2X1M will be energized over their previously traced circuits, and the pressure will be decreased to the extent necessary to restore the speed characteristics of the cut to the desired value. In particular, exhaust magnet 2X1M is energized under these conditions over a circuit extending from terminal *f* of speed control unit 4 over leads 36 and 37, the front point of contact *e* of relay 1–2RC, front contact *f* of relay AP, front contact *f* of relay RL2, lead 93, back contact *b* of relay 20PR, and through the winding of relay 2X1M to terminal N of the battery. Magnet 2X2M will be energized over a circuit extending from terminal *g* of speed control unit 4 over leads 200 and 201, the front point of contact *d* of relay 1–2RC, front contact *g* of relay AP, front contact *e* of relay RL2, lead 94, the back point of contact *a* of relay 20PR, and through the winding of magnet 2X2M to terminal N of the battery.

When the cut clears section R1T, relay R1TR will be picked up and relay R1TP will be released. Relay R1EC will now be picked up over its previously traced circuit extending from terminal B of the battery over the back point of contact *c* of relay R1TP, lead 28, cable 9, cable 11, cable 13 (FIG. 1*d*), cable 14, cable 17, lead 28, front contact *b* of relay R2TP, lead 29, cable 17, cable 14, cable 13, cable 11, cable 9 (FIG. 1*a*), lead 29, front contact *d* of relay GAEC, lead 30, cable 9, cable 11, cable 13 (FIG. 1*d*), cable 14, cable 17, lead 30, through the winding of relay R1EC, and over the back point of contact *a* of relay R2EC to terminal N of the battery. With relay R1EC picked up, the previously traced stick circuit for relay GAEC will be interrupted at the open back point of contact *d* of relay R1EC. Accordingly, at the end of the time delay period, which is sufficient to ensure the energization of relay R1EC, relay GAEC will release. Similarly, the stick circuit for relay R1TPP will be interrupted at the open back point of contact *e* of relay R1EC and relay R1TPP will be released. Relay 1–2RC will now be released, due to the opening of its previously traced stick circuit at the opening of the back point of contact *b* of relay R1EC.

The first section of the retarder will now be restored to its previously described standby condition, in which the pressure is maintained between 75 and 82 p.s.i. by the action of Bourdon tube 54. The second section will now be controlled from its own speed control unit 7. The intake control circuit from terminal *e* of speed control unit 7, as previously described, extends over lead 95, the back point of contact *f* of relay 1–2RC, front contact *e* of relay AP, the back point of contact *c* of relay RH2, front contact *b* of relay RL2, and leads 90, 88 and 89 to the movable contact member of Bourdon tube 84. As long as terminal *e* is energized, this Bourdon tube will function as previously described to maintain the pressure between 30 and 37 p.s.i., by energizing intake magnet 2LM, relay 20PR and exhaust magnet 2X2M, as required. The circuit from terminal *f* of speed control unit extends over lead 202, the back point of contact *e* of relay 1–2RC, front contact *f* of relay AP, front contact *f* of relay RL2, lead 93, and over back contact *b* of relay 20PR to the winding of magnet 2X1M. The circuit from terminal *g* of speed control unit 7 extends over lead 203, the back point of contact *d* of relay 1–2RC, front contact *g* of relay AP, front contact *e* of relay RL2, lead 94, and over the back point of contact *a* of relay 20PR to magnet 2X2M. Magnets 2X1M and 2X2M will accordingly be energized in parallel when terminals *f* and *g* of speed control unit 7 are energized, to the extent necessary to restore the combined speed characteristics of the cut to the desired value.

When the cut occupies detector track section WT, track relay WTR will be released. However, no further circuit action will take place at this time.

When the cut clears section R2T, track relay R2TR will be picked up and relay R2TP will be released. Speed control unit 7 will now be disconnected from its input signal voltages. At the same time, relay RL2 will be released. The second section will then be returned to its standby condition, in which it is maintained between 63 and 70 p.s.i. by the action of Bourdon tube 85 as previously described. In particular, the input from velocity meter 6 to input terminal *b* of speed control unit 7 is open at the open front point of contact *a* of relay R2TP. The signal voltage supplied from R2 leaving selector 3 to terminal *a* of speed control unit 7 is open at the open front point of contact *f* of relay R2TP. The stick circuit for relay RL2 is interrupted at the open front point of contact *c* of relay R2TP.

Relay R2EC may now pick up over its previously traced circuit including back contact *a* of relay WTR, lead 77, its own winding, front contact *c* of relay R1EC, and back contact *e* of relay R2TP'. With relay R2EC up, relay R1EC will be released at the end of its time delay period due to the interruption of its stick circuit at the open back point of contact *a* of relay R2EC.

With relay R1EC released, relay R2EC remains up over its stick circuit including back contact *a* of relay WTR and its own front contact *a*.

When the cut clears section WT, track relay WTR will be energized and relay R2EC will be released. The apparatus will then be restored to its initial condition.

The sequence of operations for a medium weight cut is substantially the same as for the light cut just described. It will be initially assumed that both sections of the group retarder are in their standby conditions, with the first section maintained between 75 and 82 p.s.i. by Bourdon tube 54, and the second section held between 63 and 70 p.s.i. by Bourdon tube 85.

It will next be assumed that the weight of an approaching medium weight cut is registered by the energization of both relays RL1 and RH1. The first section of the group retarder will now be preset to a pressure between 30 and 37 p.s.i. by the action of Bourdon tube 55 as previously described. The second section of the retarder will be preset between 30 and 37 p.s.i. by the action of Bourdon tube 84 as long as the pressure in the first section remains below 35 p.s.i. so that back contact *b* of Bourdon tube 53 is closed. However, should the pressure in the first section rise above 35 p.s.i., the control of the second section will be transferred to Bourdon tube 85, which will then raise the pressure to between 63 and 70 p.s.i.

When the cut enters the first section, and speed control unit 4 becomes effective to control unit R1PC, the circuit from terminal *e* of speed control unit 4 will extend over leads 24 and 25, cable 21, lead 25 (FIG. 1*a*), front contact *b* of relay R1TPP, which will be energized at this time, lead 26, cable 9, cable 11, cable 13 (FIG. 1*d*), lead 26, front contact *a* of relay AP, lead 15, cable 19, cable 16, cable 14, cable 13, cable 11, cable 10, lead 15, the front point of contact *e* of relay RH1, the front point of contact *e* of relay RL1, and lead 43 to the movable contact of Bourdon tube 54. As previously described, this tube will function to keep the pressure between 75 and 82 p.s.i. by alternately energizing intake magnet 1HMM and relay 10PR, the latter controlling exhaust magnet 1X2M, as required.

The exhaust circuit from terminal *f* of speed control unit 4 extends at this time over leads 36 and 35, front contact *b* of relay AP, lead 34, cable 19, cable 16, cable 14, cable 13, cable 11, cable 9 (FIG. 1*a*), lead 34, front contacts *b* of relays RL1 and RH1 in multiple, lead 60, back contact *a* of relay 10PR, and lead 58 to magnet 1X1M. The circuit from terminal *g* of speed control unit 4 extends over leads 200 and 72, front contact *d* of relay AP, lead 71, cable 19, cable 16, cable 14, cable 13, cable 11, cable 10 (FIG. 1*a*), lead 71, front contact *i* of relay RL1 in multiple with front contact *g* of relay RH1, lead 70, the back point of contact *b* of relay 10PR, and over lead 59 to magnet 1X2M. Magnets 1X1M and 1X2M will accordingly be energized in parallel to effect the necessary reduction in braking force.

When the cut occupies both sections R1T and R2T, relay 1-2RC will be picked up and the second section pressure control unit R2PC will be controlled from the first section speed control unit 4. The first section has been maintained as previously described, between 75 and 82 p.s.i. Back contact *b* of Bourdon tube 53, which opens at pressures above 30 p.s.i., will accordingly be opened, and the pressure in the second section will be increased to between 63 and 70 p.s.i. by the action of Bourdon tube 85. At this time, relays RL2 and RH2 will be picked up.

A circuit from terminal *e* of speed control unit 4 will now extend over leads 24 and 69, the front point of contact *f* of relay 1-2RC, front contact *e* of relay AP, the front point of contact *c* of relay RH2, lead 91, the back point of contact *b* of relay 2HPR, and over leads 82 and 81 to intake magnet 2HMM. Energization of this magnet will cause the pressure to increase to the extent necessary to reduce the speed characteristics of the cut to the desired value. It will be noted that in this case there is no pressure ceiling established, other than the value of the fluid supply pressure.

At this time, exhaust magnets 2X1M and 2X2M will be controlled from terminals *f* and *g* of speed control unit 4 in the same manner as previously described in the case of a light cut.

When the cut clears section R1T, the first section will return to its standby condition. The second section will be operated from second section speed control unit 7. The intake circuit in this case extends from terminal *e* of speed control unit 7 over lead 95, the back point of contact *f* of relay 1-2RC, front contact *e* of relay AP, the front point of contact *c* of relay RH2, lead 91, the back point of contact *b* of relay 2HPR, and over leads 82 and 81 to magnet 2HMM. The exhaust circuits are the same as those described for the light weight cut, controlling exhaust magnets 2X1M and 2X2M from terminals *f* and *g* of speed control unit 7 over the back points of contacts *d* and *e* of relay 1-2RC.

When the cut clears section R2T, the second section will be restored to its standby condition as previously described.

The operation of the retarder in braking a heavy cut is substantially the same as for the light and medium cuts, and only the operations which are different will be described. When the heavy cut is registered in the first section by energizing relay RH1 and maintaining relay RL1 released, the previously described preset circuit for heavy cuts will be established, and Bourdon tube 54 will function to maintain the pressure in the first section between 75 and 82 p.s.i. Since, with the pressure in this range, neither of the contacts of Bourdon tube 53 will be closed, the pressure in the second section will be maintained between 63 and 70 p.s.i. by the action of Bourdon tube 85 as previously described.

When the heavy cut is in the first section under the control of speed control unit 4, the intake circuit extends from terminal *e* of unit 4 over leads 24 and 25, cable 21, lead 25 (FIG. 1*a*), front contact *b* of relay R1TPP, lead 26, cable 9, cable 11, cable 13 (FIG. 1*d*), lead 26, front contact *a* of relay AP, lead 15, cable 19, cable 16, cable 14, cable 13, cable 11, cable 10 (FIG. 1*a*), to lead 15, where the circuit divides into two branches. The first extends over the front point of contact *e* of relay RH1, the back point of contact *e* of relay RL1, the back point of contact *b* of relay 1HPR, and thence over leads 51 and 52 to intake magnet 1HMM. The second branch extends from lead 15 in FIG. 1*a* over front contact *d* of relay RH1, back contact *d* of relay RL1, lead 66, the back point of contact *a* of relay 1HPR, and over lead 57 to intake magnet 1HM. Magnets 1HM and 1HMM will accordingly be energized in parallel to rapidly increase the braking pressure to a high sustained value, limited only by the pressure of the supply source, until speed control terminal *e* becomes deenergized.

Exhaust terminals *f* and *g* of speed control unit 4 control exhaust magnets 1X1M and 1X2M in parallel in the same manner as described for light and medium cuts.

When the cut occupies both sections R1T and R2T, relay 1-2RC will be picked up, relay RH2 will be picked up, and pressure control unit R2PC will be controlled from speed control unit 4. The intake circuit in this case extends from terminal *e* of speed control unit 4 over leads 24 and 69, the front point of contact *f* of relay 1-2RC, front contact *e* of relay AP, and thence over two paths, a first extending over the front point of contact *c* of relay RH2, lead 91, back contact *b* of relay 2HPR, and over leads 82 and 81 to intake magnet 2HMM, and the second extending from front contact *e* of relay AP over front contact *b* of relay RH2, back contact *c* of relay RL2, lead 92, the back point of contact *a* of relay 2HPR, and over leads 80 and 79 to intake magnet 2HM. Magnets 2HM and 2HMM are accordingly energized in parallel for as long as required to bring the speed characteristics down to the desired value. At this time, terminals *f* and *g* of speed control unit 4 control exhaust magnets 2X1M and 2X2M in parallel in the same manner as described for light and medium cuts when required to reduce the amount of the braking.

When the cuts clear section R1T, the first section is returned to its standby condition. The second section is now controlled by second section speed control unit 7. The intake circuits in this case extend from terminal *e* of speed control unit 7 over lead 95, the back point of contact *f* of relay 1–2RC, front contact *e* of relay 1–2AP, and thence over two paths to magnets 2HM and 2HMM which are the same as previously traced for control by the first section speed control unit 4. Magnets 2HM and 2HMM thus continue to be controlled in parallel when increased braking pressure is required. Exhaust magnets 2X1M and 2X2M are controlled in parallel from terminals *f* and *g* of speed control unit 7 in the manner previously described for light and medium cuts.

When the second section is vacated, it is returned to its standby condition in the manner previously described.

While we have described the operation of our system for only a single cut, it will be apparent from the description that as each section becomes vacated by a cut, it is made available for use by a following cut. In particular, it will be apparent that separate control is available for two cuts each occupying one of the two retarder control sections shown.

While we have described only one embodiment of our invention in detail, it will be apparent to those skilled in the art after reading our description that many changes and modifications could be made within the scope of our invention. Accordingly, we do not wish to be limited to the details shown, but only by the scope of the following claims.

Having thus described our invention, what we claim is:

1. Control means for a car retarder, comprising, in combination, pneumatic actuating motors for said retarder, a pair of intake valves for controlling the admission of air under pressure to said actuating motors, a first fast acting and a second relatively slowly acting exhaust valve for controlling the exhaust of air from said motors at first and second rates respectively, said first rate being lower than said second rate and said first exhaust valve having a smaller capacity than said second exhaust valve, means for producing an intake signal in response to a cut of cars in said retarder moving at a speed in excess of a desired speed, means for producing an exhaust signal in response to a cut of cars in said retarder moving at a speed below said desired speed, means responsive to the weight of cars in said retarder for applying said intake signal to actuate one or both of said intake valves according as said weight is light or heavy respectively, and means for applying said exhaust signal to actuate said exhaust valves in parallel.

2. Control apparatus, comprising, in combination, a car retarder having actuating motors adapted to be controlled by fluid under pressure, speed measuring means continuously responsive to the speed of vehicles in said retarder for producing an output signal voltage in accordance with said speed, signal generating means having an output signal voltage adjustable in accordance with a desired speed, means for comparing said voltages to produce a first control voltage when said vehicle speed is greater than said desired speed and a second control voltage when said vehicle speed is less than said desired speed, first, second and third intake valve means operatively connected to said motors for admitting fluid under pressure thereto when actuated, said first intake valve means having a smaller capacity than said second and third intake valve means, exhaust valve means operatively connected to said motors for exhausting said motors when actuated, means for actuating said exhaust valve means in response to said second control voltage, and means responsive to the weight of cars in said retarder for applying said first control voltage to said first, said second, or said second and third intake valve means according as said weight is light, medium or heavy.

3. In combination, a car retarder, control means for controlling at an adjustable rate the braking force exerted by said retarder, means for measuring the speed of a car in said retarder, means actuated by said speed measuring means and operatively connected to said control means to reduce the speed of the car to a predetermined value, and means controlled by the weight of a car in said retarder for adjusting the rate of response of said control means.

4. Control means for a car retarder, comprising, in combination, pneumatic actuating motors for said retarder, a plurality of intake valve means for applying air under pressure to said actuating motors, means for selecting intake valve means from said plurality in accordance with the weight of a cut of cars in said retarder for adjusting the rate of response of said actuating motors, means for producing an intake signal in response to a cut of cars in said retarder moving at a speed in excess of a desired speed, and means for applying said intake signal to said selected intake valve means to reduce the speed of said cut to said desired speed.

5. Control apparatus, comprising, in combination, a car retarder adapted to be controlled by fluid under pressure, means for producing a signal in accordance with the speed of vehicles in said retarder, means for producing an output signal in accordance with a desired speed, means for comparing said signals to produce a first control signal when said vehicle speed is greater than said desired speed and a second control signal when said vehicle speed is less than said desired speed, first, second and third intake valve means operatively connected to said retarder for admitting fluid under pressure thereto when actuated, said first intake valve means having a smaller capacity than said third intake valve means, first and second exhaust valve means operatively connected to said retarder for removing fluid under pressure when actuated, said first exhaust valve means having a smaller capacity than said second exhaust valve means, means for actuating said exhaust valve means in response to said second control signal, and means responsive to the weight of vehicles in said retarder for applying said first control signal to said first, said second, or said second and third intake valve means according as said weight is light, medium or heavy.

6. Speed control apparatus for railway cars, comprising, in combination, a car retarder, control means for adjusting the braking force exerted by said retarder, speed measuring means for producing a signal in accordance with the speed of cars in said retarder, speed selecting means for producing a signal in accordance with the desired leaving speed of cars from said retarder, means controlled by said speed measuring means and said speed selecting means for actuating said control means to reduce the leaving speed of cars to said desired speed, and weight responsive means for adjusting the rate of response of said control means in accordance with the weight of cars in said retarder.

7. In combination, a car retarder, means for controlling at an adjustable rate the braking force exerted by said retarder, means for measuring the speed of a car in said retarder, means actuated by said speed measuring means and operatively connected to speed controlling means to reduce the speed of the car to a predetermined value, means for weighing cars in said retarder, first means controlled by said weighing means for actuating said controlling means to maintain the braking force exerted by said retarder within a range in accordance with the weight of the cars, and second means controlled by said weighing means for adjusting the rate of response of said braking force controlling means.

8. Control apparatus, comprising, in combination, condition control means, first actuating means having a first time constant for actuating said control means at a first rate, second actuating means having a time constant greater than said first time constant for actuating said control means at a rate greater than said first rate, and means responsive to the condition controlled by said control means and operatively connected to said actuating means to control said actuating means in accordance with departure of said condition from a datum.

9. Speed control apparatus for railway cars, comprising, in combination, a car retarder, control means for adjusting the braking force applied by said retarder, speed measuring means for producing a signal in accordance with the speed of cars in said retarder operatively connected to actuate said control means, and weight responsive means for adjusting the rate of response of said control means in accordance with the weight of cars in said retarder.

10. Control apparatus, comprising, in combination, motor means, means actuated by said motor means to control a first condition, control means for operating said motor means at an adjustable rate, means responsive to a second condition and operatively connected to said control means to adjust said rate in accordance with said second condition, and means responsive to said first condition for actuating said control means in accordance with changes of said first condition from a datum condition.

11. Apparatus of the class described, comprising, in combination, a fluid pressure motor, a plurality of intake valve means for supplying fluid under pressure to said motor, a first fast acting and a second relatively slowly acting exhaust valve for removing fluid under pressure from said motor at first and second rates respectively, said first rate being lower than said second rate, means for producing an intake signal in response to a change in a first sense in a first variable from a prescribed condition, means for producing an exhaust signal in response to a change in a second sense in said first variable from said prescribed condition, means responsive to the value of a second variable and said intake signal for selectively actuating said intake valve means in a combination determined by said value, and means responsive to said exhaust signal for actuating said exhaust valves in parallel.

12. Control apparatus for a car retarder having adjustable braking means, comprising, in combination, means having a short time constant for adjusting at a first rate the force applied by said braking means, means having a longer time constant for adjusting at a higher second rate the force applied by said braking means, means for actuating said adjusting means in parallel, and means having a time constant on the order of said short time constant and responsive to the braking effect produced by said braking means on a car in said retarder for controlling said actuating means.

13. Control means for a force applying system, comprising, in combination, a plurality of means for varying the force applied by said system at a rate determined by the number of said means that are actuated, means responsive to a first variable for generating an actuating signal, and means responsive to the value of a second variable and actuated in accordance with the nearest one to said value of a predetermined set of values for applying said actuating signal to a corresponding number of said plurality of force varying means.

14. Control apparatus, comprising, in combination, a car retarder, speed measuring means responsive to the speed of a vehicle in said retarder for producing an output signal in accordance with said speed, signal generating means for producing an output signal in accordance with a desired speed, means for comparing said output signals to produce a first control signal when said vehicle speed is greater than said desired speed and a second control signal when said vehicle speed is less than said desired speed, a plurality of first means for increasing the braking force of said retarder, at least one of said first means having a lower capacity than at least one other of said first means, second means for decreasing the braking force of said retarder, means for actuating said second means in response to said second control signal, and means responsive to the weight of vehicles in said retarder and said first control signal for actuating combinations of said first means selected in accordance with said weight.

15. Apparatus of the class described, comprising, in combination, a fluid pressure motor, measuring means continuously responsive to a first variable for producing an output signal in accordance therewith, signal generating means for producing an output signal in accordance with a desired value of said first variable, means for comparing said output signals to produce a first control signal when the value of said first variable is greater than said desired value and a second control signal when the value of said variable is less than said desired value, a plurality of intake valve means operatively connected to said motor for admitting when actuated fluid under pressure to the motor, exhaust valve means operatively connected to said motor for exhausting when actuated fluid under pressure from the motor, means for actuating said exhaust valve means in response to said second control signal, and means responsive to a second variable for applying said first control signal to a group of said intake valve means selected in accordance with the value of said second variable.

16. In combination, a servomechanism, means for controlling at an adjustable rate the operation of said servomechanism, means for measuring the value of a first variable controlled by said servomechanism, means controlled by said measuring means and operatively connected to said controlling means to bring the value of said first variable to a predetermined value, and means controlled by a second variable for adjusting the rate of response of said controlling means.

17. Control apparatus, comprising, in combination, a fluid pressure motor, a plurality of intake valve means for controlling the admission of fluid under pressure to said motor, means for selecting intake valve means from said plurality in accordance with the value of a first variable for adjusting the rate of response of said motor, means for producing an intake signal in response to a value in excess of a desired value of a second variable, and means responsive to said intake signal for actuating said selected intake valve means to reduce the value of said second variable to said desired value.

18. Control apparatus for a car retarder, comprising, in combination, means for increasing at an adjustable rate the braking force of said retarder, means for adjusting said rate in accordance with the weight of cars occupying said retarder, means for producing a braking signal in response to a car in said retarder moving at a speed in excess of a desired speed, and means responsive to said braking signal for controlling said braking force increasing means to reduce the speed of said car to said desired speed.

19. Control apparatus, comprising, in combination, a car retarder, means for producing a signal in accordance with the speed of a vehicle in said retarder, means for producing a signal in accordance with a desired speed for said vehicle, means for comparing said signals to produce a first control signal when said vehicle speed is greater than said desired speed and a second control signal when said vehicle speed is less than said desired speed; first, second and third control means for selectively increasing the braking force of said retarder, said first means having a smaller capacity than said third means, first and second relieving means for decreasing the braking force of said retarder, said first relieving means having a shorter time constant and a smaller capacity than said second relieving means, means for actuating said relieving means in parallel in response to said second control signal, and means responsive to the weight of vehicles in said retarder for applying said first control signal to said first, said second, or said second and third control means according as said weight is light, medium or heavy respectively.

References Cited in the file of this patent

UNITED STATES PATENTS

| | | |
|---|---|---|
| 1,480,568 | Pilliod | Jan. 15, 1924 |
| 2,286,104 | Platz | June 9, 1942 |
| 2,308,500 | Eskergian | Jan. 19, 1943 |
| 2,317,133 | Hines | Apr. 20, 1943 |
| 2,389,051 | Hines | Nov. 13, 1945 |